(12) United States Patent
Fredrickson et al.

(10) Patent No.: US 8,127,877 B2
(45) Date of Patent: Mar. 6, 2012

(54) AIR INTAKE SYSTEM FOR CONTROLLING SOUND EMISSION

(75) Inventors: Richard A. Fredrickson, Roseau, MN (US); Jerry A. Olson, Roseau, MN (US); Jason A. Eichenberger, Warroad, MN (US)

(73) Assignee: Polaris Industries Inc., Medina, MN (US)

( * ) Notice: Subject to any disclaimer, the term of this patent is extended or adjusted under 35 U.S.C. 154(b) by 380 days.

(21) Appl. No.: 12/355,349

(22) Filed: Jan. 16, 2009

(65) Prior Publication Data

US 2010/0089355 A1    Apr. 15, 2010

Related U.S. Application Data

(60) Provisional application No. 61/104,436, filed on Oct. 10, 2008.

(51) Int. Cl.
*B60K 13/02* (2006.01)
*F02M 35/10* (2006.01)

(52) U.S. Cl. .................. 180/68.3; 123/184.48
(58) Field of Classification Search ........ 180/68.1–68.3, 180/291, 292, 225, 182; 123/184.24, 184.34, 123/184.42, 183.47, 184.25, 184.35, 184.43, 123/184.48; 181/204, 249, 250, 266, 273, 181/276
See application file for complete search history.

(56) References Cited

U.S. PATENT DOCUMENTS

| | | | |
|---|---|---|---|
| 3,712,416 A | 1/1973 | Swanson et al. | |
| 3,791,482 A | 2/1974 | Sykora | |
| 3,800,910 A | 4/1974 | Rose | |
| 3,966,014 A | 6/1976 | Gowing | |
| 4,109,751 A * | 8/1978 | Kabele | 181/247 |
| 4,136,756 A | 1/1979 | Kawamura | |
| 4,254,746 A * | 3/1981 | Chiba et al. | 123/184.42 |
| 4,592,316 A * | 6/1986 | Shiratsuchi et al. | 123/195 C |
| 5,016,728 A | 5/1991 | Zulawski | |
| 5,152,365 A | 10/1992 | Aoshima | |
| 5,251,718 A * | 10/1993 | Inagawa et al. | 180/190 |
| 6,216,809 B1 * | 4/2001 | Etou et al. | 180/68.3 |
| 6,247,442 B1 | 6/2001 | Bedard et al. | |
| 6,745,862 B2 | 6/2004 | Morii et al. | |
| 7,004,137 B2 * | 2/2006 | Kunugi et al. | 123/184.35 |
| 7,040,437 B1 | 5/2006 | Fredrickson et al. | |
| 7,159,557 B2 * | 1/2007 | Yasuda et al. | 123/184.57 |
| 7,275,512 B2 * | 10/2007 | Deiss et al. | 123/184.55 |

(Continued)

FOREIGN PATENT DOCUMENTS

| | | |
|---|---|---|
| EP | 1712772 | 10/2006 |
| FR | 2307974 | 11/1976 |
| WO | WO2004/031567 | 5/2004 |

OTHER PUBLICATIONS

International Preliminary Report on Patentability for International Application No. PCT/US2009/066110, 3 pgs.

(Continued)

*Primary Examiner* — J. Allen Shriver, II
*Assistant Examiner* — James M Dolak
(74) *Attorney, Agent, or Firm* — Faegre Baker Daniels LLP

(57) ABSTRACT

An air intake system for a vehicle is disclosed. The air intake system may include a first plenum housing having a fluid inlet and a fluid outlet and a fluid directing member which receives air from the fluid inlet of the plenum housing and directs the air away from the fluid outlet of the plenum housing.

18 Claims, 19 Drawing Sheets

U.S. PATENT DOCUMENTS

| | | |
|---|---|---|
| 7,357,207 B2 | 4/2008 | Väisänen |
| 7,458,354 B1 * | 12/2008 | Phaneuf et al. .......... 123/184.35 |
| 2002/0023792 A1 * | 2/2002 | Bouffard et al. ............. 180/68.4 |
| 2006/0032700 A1 | 2/2006 | Vizanko |
| 2006/0236980 A1 * | 10/2006 | Maruo et al. .................. 123/472 |
| 2007/0119650 A1 * | 5/2007 | Eide .............................. 181/212 |

OTHER PUBLICATIONS

International Search Report for International Application No. PCT/US2009/066110, Mar. 18, 2010, 11 pgs.

Article 34 Amendment filed in International Application No. PCT/US2009/066110, Nov. 15, 2010, 9 pgs.

* cited by examiner

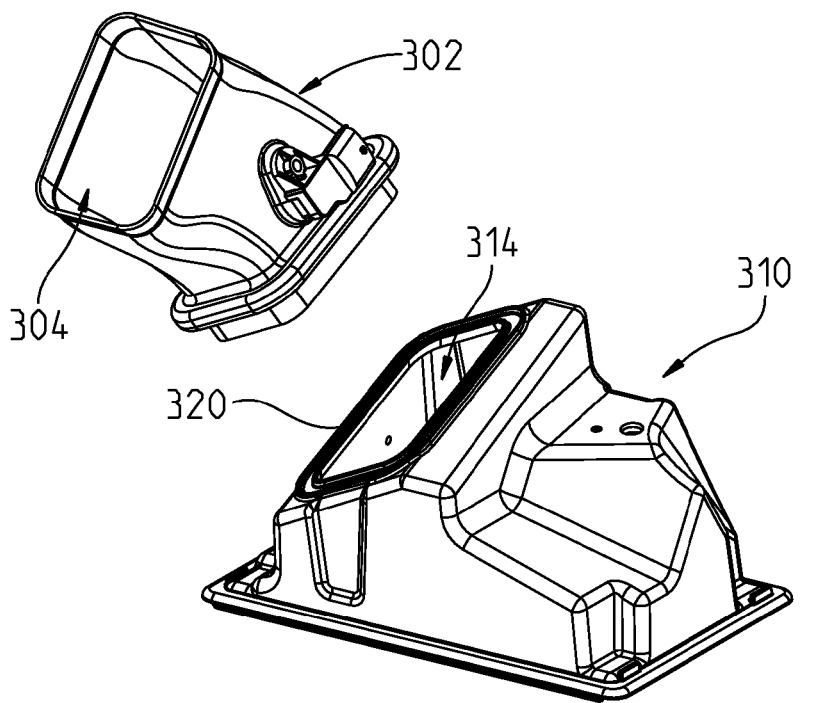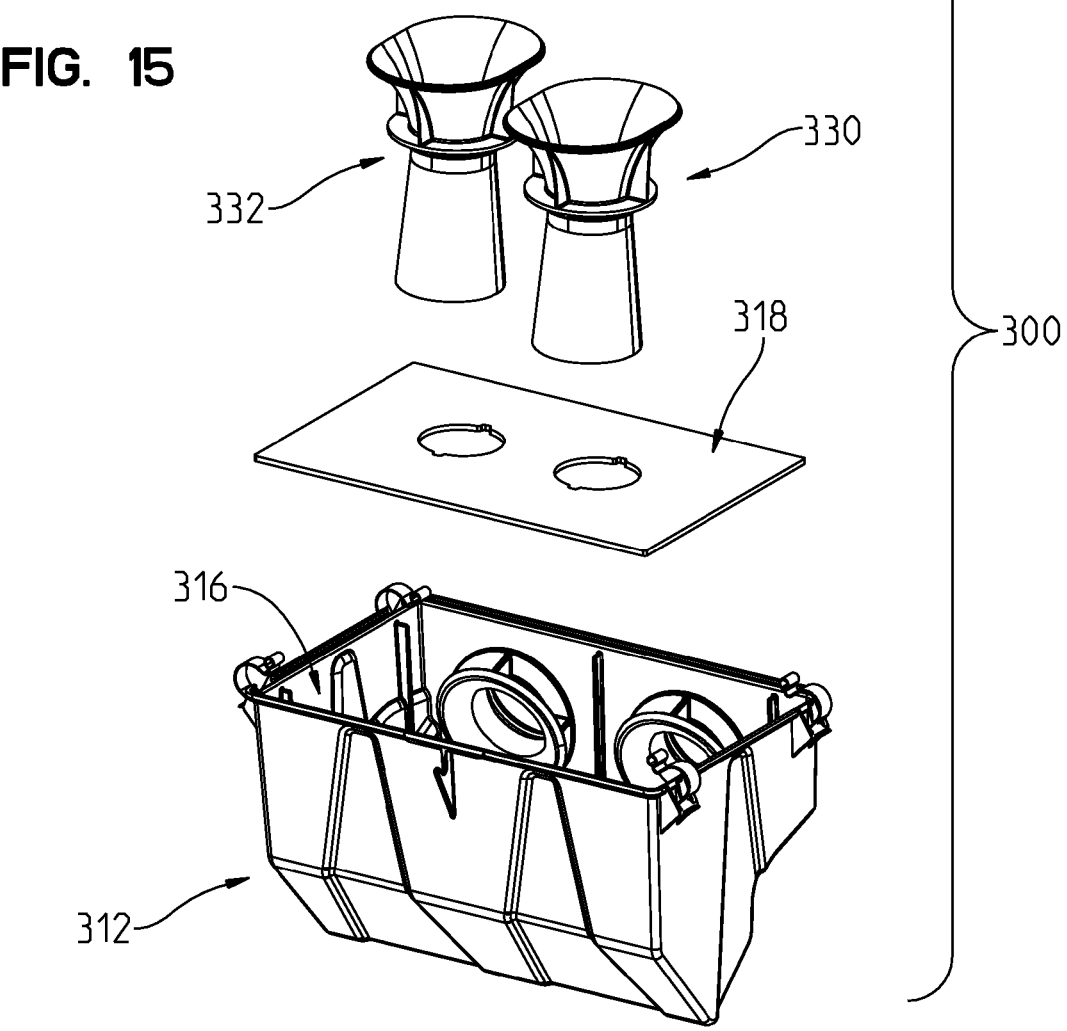
FIG. 15

AIR INTAKE SYSTEM FOR CONTROLLING SOUND EMISSION

RELATED APPLICATIONS

This application claims the benefit of U.S. Provisional Patent Application Ser. No. 61/104,436, filed Oct. 10, 2008, the disclosure of which is expressly incorporated by reference herein. Further, the disclosure of U.S. Design Application Ser. No. 29/301,572, filed Mar. 7, 2008, is expressly incorporated by reference herein.

FIELD

The present invention relates to sound control devices and in particular for sound control devices for an air intake system of a vehicle.

BACKGROUND

Air intakes for internal combustion engines generate noise which is associated with the movement of the air through the air intake system and the function of the internal combustion engine. The noise often escapes through the air inlet or air inlets of the air intake system. This noise may be heard by observers as the vehicle passes and by an operator of the vehicle.

In some vehicles, these air inlets may be positioned such that this noise escapes from openings positioned proximate to the operator. This may increase the noise level experienced by the operator and/or passenger to levels above tolerable sound levels. Further, the noise from the air intake system may increase the overall vehicle sound emissions.

SUMMARY

In an exemplary embodiment of the present disclosure, an air intake system for a vehicle is provided. The air intake system may include one or more air inlets directed towards an operator of the vehicle or within an operator area of the vehicle. The air intake system may include one or more fixed length air directing members situated close to the air inlets of the air intake system and extending into a volume. These air directing members may be tuned to reduce or eliminate certain sound emission frequencies from exiting the air intake system via the air inlets of the air intake system.

In another exemplary embodiment of the present disclosure, a vehicle is provided. The vehicle comprising a plurality of ground engaging members; a frame supported by the plurality of the ground engaging members; an internal combustion engine supported by the frame and operatively coupled to at least one of the plurality of ground engaging members to propel the vehicle; and an air intake system including an air inlet and an air outlet. The air outlet being in fluid communication with an air inlet controlling device of the engine. The air intake system including a first conduit which passes air received at the air inlet of air intake system towards the air outlet of the air intake system. The first conduit being positioned to receive the air as it travels from the air inlet of the of air intake system to the air outlet of the air intake system. The air flows along an exterior of the first conduit and through an interior of the first conduit as it travels from the air inlet of the of air intake system to the air outlet of the air intake system. In a variation thereof, the air flows first through the interior of the first conduit and subsequently along the exterior of the first conduit as it travels from the air inlet of the of air intake system to the air outlet of the air intake system. In another variation, the air intake system includes a first housing and a second housing. An interior of the first housing receiving the air passing through the air inlet of the air intake system and the second housing being in fluid communication with the air inlet controlling device and with the interior of the first housing. In yet another variation, the air intake system includes a first air inlet and a second air inlet, the air from the first air inlet flows through the interior of the first conduit and the air from both the first air inlet and the second air inlet flow along the exterior of the first conduit. In still another variation, the vehicle farther comprises a steering post operatively coupled a portion of the plurality of ground engaging members; a handlebar coupled to the steering post; and an operator seat positioned rearward of the steering post. The air intake system includes a first plenum housing into which the first conduit extends and a first air inlet and a second air inlet both in fluid communication with an interior of the first plenum housing. The first air inlet being positioned on a first side of the steering post and the second air inlet being positioned on a second side of the steering post. In a refinement thereof, the first plenum housing is in fluid communication with the engine through a fluid outlet. The fluid outlet being positioned closer to the first fluid inlet than the to the second fluid inlet, and wherein the first conduit assists in generally balancing the sound emitted from the first fluid inlet and the second fluid inlet. In another refinement, the vehicle further comprises a second fluid conduit extending in the first plenum housing. The first plenum housing including a cowling housing member and a tray housing member which includes the fluid outlet of the first plenum member. The first conduit and the second conduit are supported by the tray housing member. In still a further refinement, the first fluid conduit is positioned over the fluid outlet of the first plenum housing. In yet still a further refinement, the first conduit directs air from the first fluid inlet away from the fluid outlet of the first plenum housing as the air passes through an interior of the first conduit and towards the fluid outlet of the first plenum housing as the air passes along an exterior of the first conduit and the second conduit directs air from the second fluid inlet towards the fluid outlet of the first plenum housing. In yet still a further refinement, the first conduit and the second conduit are each funnel shaped.

In a further exemplary embodiment of the present disclosure, an air intake system for an internal combustion engine of a vehicle is provided. The air intake system comprising a first plenum housing having an air inlet and an air outlet, the first plenum housing being in fluid communication with the internal combustion engine through the air outlet, the first plenum housing including a plurality of housing members which cooperate to form the first plenum housing; a second plenum housing having a plurality of air inlets and an air outlet, the air outlet of the second plenum housing being positioned closer to one of a first air inlet of the second plenum housing and a second air inlet of the second plenum housing than the other of the first air inlet of the second plenum housing and the second air inlet of the second plenum housing, the air outlet of the second plenum housing being in fluid communication with both the first air inlet of the second plenum housing and the second air inlet of the second plenum housing; the air outlet of the second plenum housing being in fluid communication with the air inlet of the first plenum housing such that air flows from the second plenum housing to the first plenum housing, the second plenum housing including a plurality of housing members which cooperate to form the second plenum housing; and a first air directing conduit in fluid communication with the first air inlet of the second plenum housing. The first directing conduit including an air inlet and an air outlet which is positioned within the second plenum housing.

Air entering the air inlet of the first air directing conduit flowing through an interior of the first air directing conduit to the air outlet of the first air directing conduit and away from the air outlet of the second plenum housing and then between the first air directing conduit and the second plenum housing towards the air outlet of the second plenum housing. In a variation thereof, the air intake system further comprises a second air directing conduit in fluid communication with the second air inlet of the second plenum housing. The second directing conduit including an air inlet and an air outlet which is positioned within the second plenum housing. Air entering the air inlet of the second air directing conduit flows through an interior of the second air directing conduit to the air outlet of the second air directing conduit and onto the air outlet of the second plenum housing. In a refinement thereof, the air outlet of the second air directing member is positioned to direct air from the second air directing member towards the air outlet of the second plenum housing. In a further refinement thereof, the air from both the first air inlet of the second plenum housing and the second air inlet of the second plenum housing must travel between an exterior of the first air directing conduit and a first housing member of the second plenum housing to reach the air outlet of the second housing, the exterior of the first air directing conduit being shaped to direct the air towards the air outlet of the second plenum housing. In yet a further refinement, the first plenum housing further includes a divider which segments an interior of the first plenum housing into a plurality of chambers. A first chamber being in fluid communication with the air inlet and a second chamber being in fluid communication with the air outlet. Air from the first chamber being able to flow into the second chamber. In another variation, the first air directing conduit is funnel shaped.

In yet a further exemplary embodiment of the present disclosure, an air intake system for an internal combustion engine of a vehicle is provided. The vehicle comprising a first plenum housing having a fluid inlet and a fluid outlet, the first plenum housing being in fluid communication with the engine through the fluid outlet; a second plenum housing having a plurality of fluid inlets and a fluid outlet, the fluid outlet being positioned closer to a first fluid inlet than a second fluid inlet and the fluid outlet being in fluid communication with both the first fluid inlet and the second fluid inlet; the fluid outlet of the second plenum housing being in fluid communication with the fluid inlet of the first plenum housing such that air flows from the second plenum housing to the first plenum housing; and a fluid directing conduit in fluid communication with the first fluid inlet of the second plenum housing, the fluid directing conduit directing air received through the first fluid inlet of the second plenum housing away from the fluid outlet of the second plenum housing. In a variation thereof, the air intake system further comprises a fluid conduit in fluid communication with the fluid outlet of the second plenum housing and with the fluid inlet of the first plenum housing.

In still a further exemplary embodiment of the present disclosure, a method of controlling noise emitted by an air intake system of an internal combustion engine is provided. The method comprising the steps of providing a first fluid conduit having an air inlet and an air outlet, an area of the air outlet being less than an area of the air inlet; positioning the first fluid conduit into a first plenum housing of the air intake system such that air from a first air inlet of the first plenum housing enters an interior of the first fluid conduit through the air inlet of the first fluid conduit and exits through the air outlet of the first fluid conduit; and positioning an air outlet of the first plenum housing at a location such that the air exiting the air outlet of the first fluid conduit is directed by an exterior of the first fluid conduit towards the air outlet of the first plenum housing. In a variation thereof, the first fluid conduit is supported by a tray housing member of the first plenum housing and a space between the first fluid conduit and the tray housing member is a flow path for air to reach the air outlet of the first plenum housing.

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 15 illustrates an exploded view of the second plenum housing and the fluid conduit which connects the first plenum housing to the second plenum housing;

Corresponding reference characters indicate corresponding parts throughout the several views. Unless stated otherwise the drawings are proportional with the exception of the flowcharts and block representations.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a snowmobile, it should be understood that the features of the air intake system disclosed herein may have application to other types of vehicles such as all-terrain vehicles, motorcycles, watercraft, utility vehicles, and golf carts.

Figure 1:
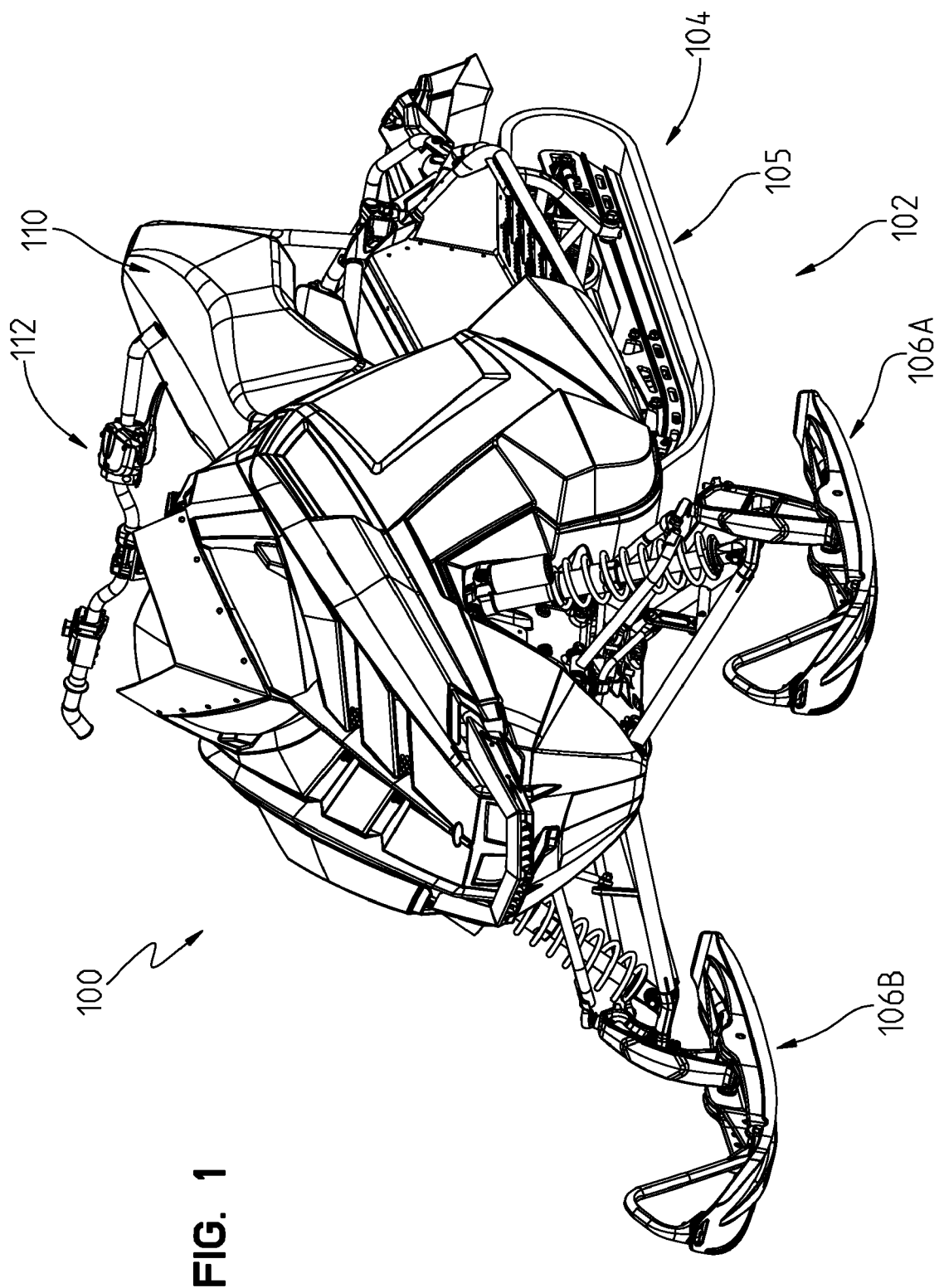
FIG. 1 illustrates a front, left, perspective view of an exemplary snowmobile.
Figure 2:
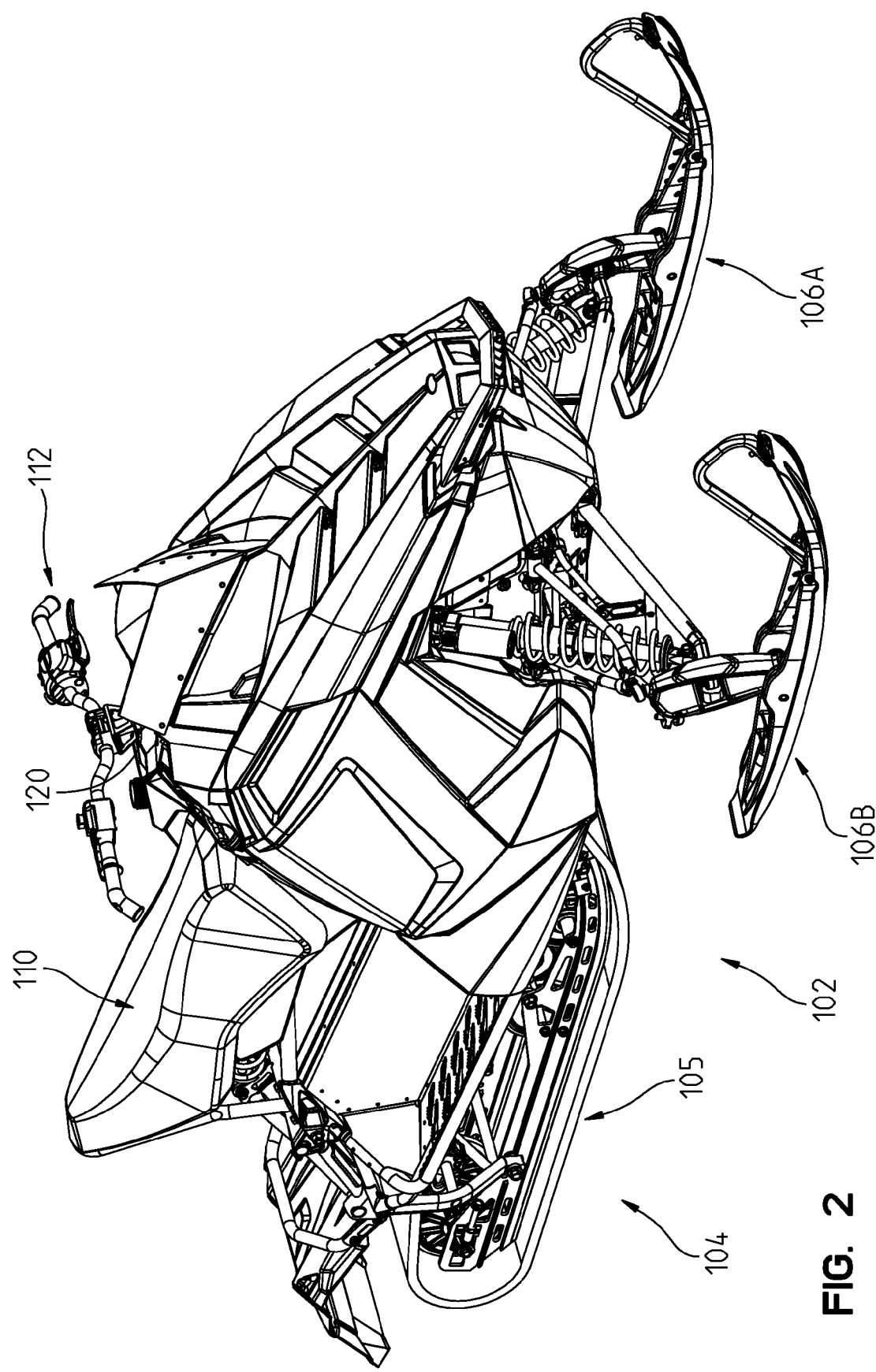
FIG. 2 illustrates a front, right, perspective view of the exemplary snowmobile of FIG. 1.

Referring to FIGS. 1 and 2, an illustrated embodiment of an exemplary vehicle 100 is shown. The illustrated vehicle 100 is a snowmobile. Vehicle 100 as illustrated includes a plurality of ground engaging members 102. Illustratively, ground engaging members 102 include an endless track assembly 104 including a belt 105 and a pair of front skis 106A and 106B. Endless track assembly 104 supports a rear portion of vehicle 100 while skis 106 support a front portion of vehicle 100. Further, endless track assembly 104 is operatively coupled to an engine 108 (see FIG. 3) which propels vehicle 100 by advancing belt 105. An operator is positioned on seat 110 and steers skis 106A and 106B, and hence vehicle 100, by turning handlebars 112. Handlebars 112 are coupled to a steering post 120 which is operatively coupled to skis 106A and 106B.

Additional details regarding exemplary embodiments of vehicle 100 are provided in U.S. Provisional Patent Application Ser. No. 61/104,436, filed Oct. 10, 2008, the disclosure of which is expressly incorporated by reference herein.

Figure 3:
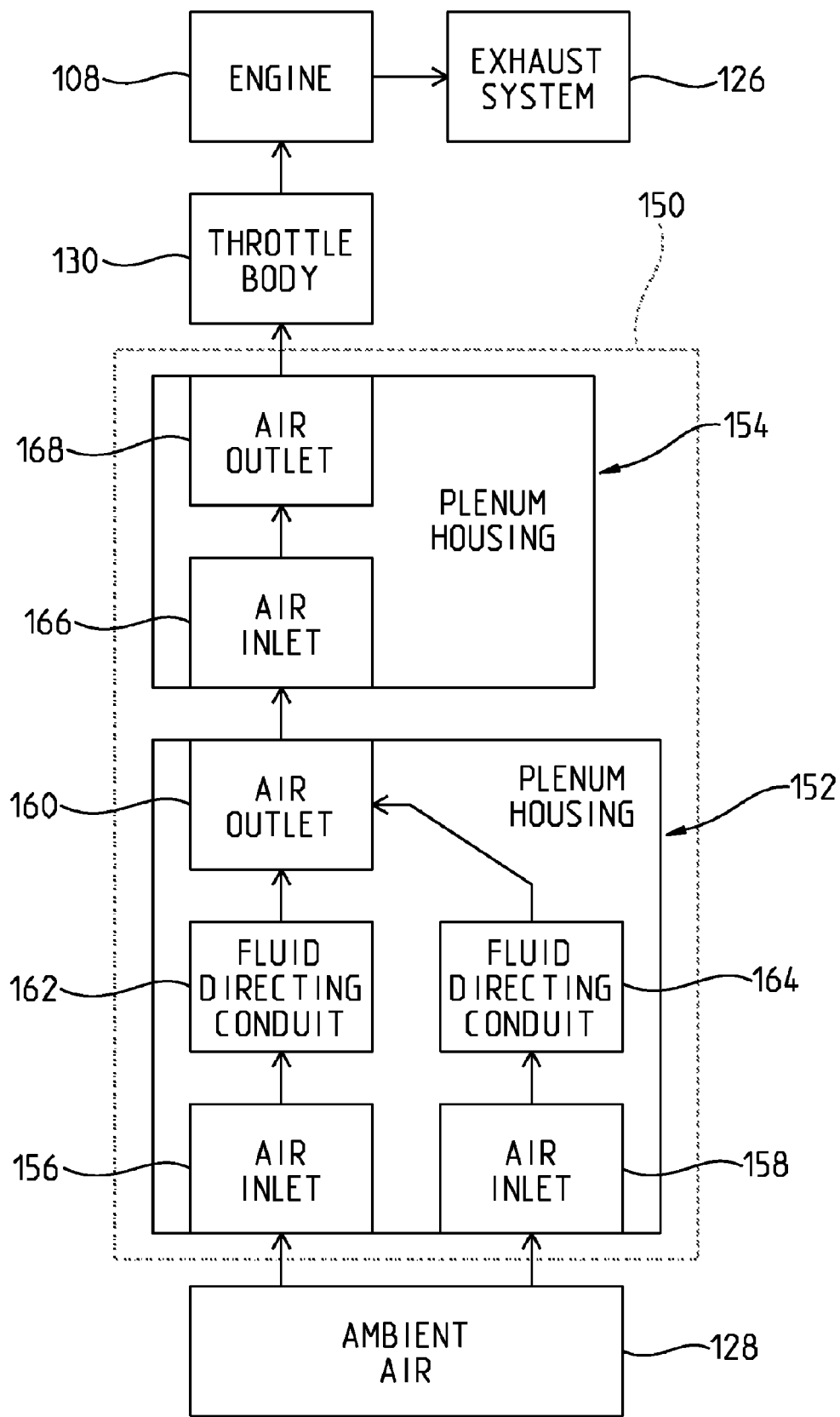
FIG. 3 is a representative view of an air intake system in fluid communication with an engine through a throttle body.

Referring to FIG. 3, an exemplary air intake system 150 for vehicle 100 is shown. Air intake system 150 provides ambient air 128 to a throttle body 130 which in turn provides the air to engine 108. During normal operation, engine 108 uses the air provided by air intake system 150 in the combustion process and communicates exhaust gases to an exhaust system 126.

Air intake system 150, as illustrated, includes a first plenum housing 152 and a second plenum housing 154. First plenum housing 152 is shown including a first air inlet 156 and a second air inlet 158 along with an air outlet 160. Although two air inlets are shown, first plenum housing 152 may have a single air inlet or may have three or more air inlets. In the same manner, although a single air outlet 160 is shown, first plenum housing 152 may have two or more air outlets.

In one embodiment, air inlets 156 and 158 are the air inlets of air intake system 150. In one embodiment, air intake system 150 includes one or more guards which serve as the air inlets and which are in fluid communication with air inlets 156 and 158 of first plenum housing 152. Exemplary guards include screens or other covers which permit air flow, but which restrict the entry of foreign matter into air intake system 150.

Once the air is introduced into first plenum housing 152, it flows eventually to air outlet 160. Along the way to air outlet 160, the air entering air inlet 156 encounters a first fluid directing conduit 162 and the air entering air inlet 158 encounters a second fluid directing conduit 164. Each of conduits 162 and 164 direct the flow of the respective air at least for part of the way as it travels to the air outlet 160 of first plenum housing 152.

Once the air exits first plenum housing 152 through air outlet 160 it is introduced into second plenum housing 154 through an air inlet 166. Second plenum housing 154 is shown including the air inlet 166 along with an air outlet 168. Although a single air inlet is shown, second plenum housing 154 may have multiple air inlets. In the same manner, although a single air outlet 168 is shown, second plenum housing 154 may have multiple air outlets.

Once the air leaves second plenum housing 154 through air outlet 168 it is communicated to an air inlet controlling device which provides a regulated amount of air to engine 108 for use during combustion. The illustrated air inlet controlling device is a throttle body 130. Other exemplary air inlet controlling devices include a carburetor. Engine 108 exhausts exhaust gases through an exhaust system 126.

Figure 4:
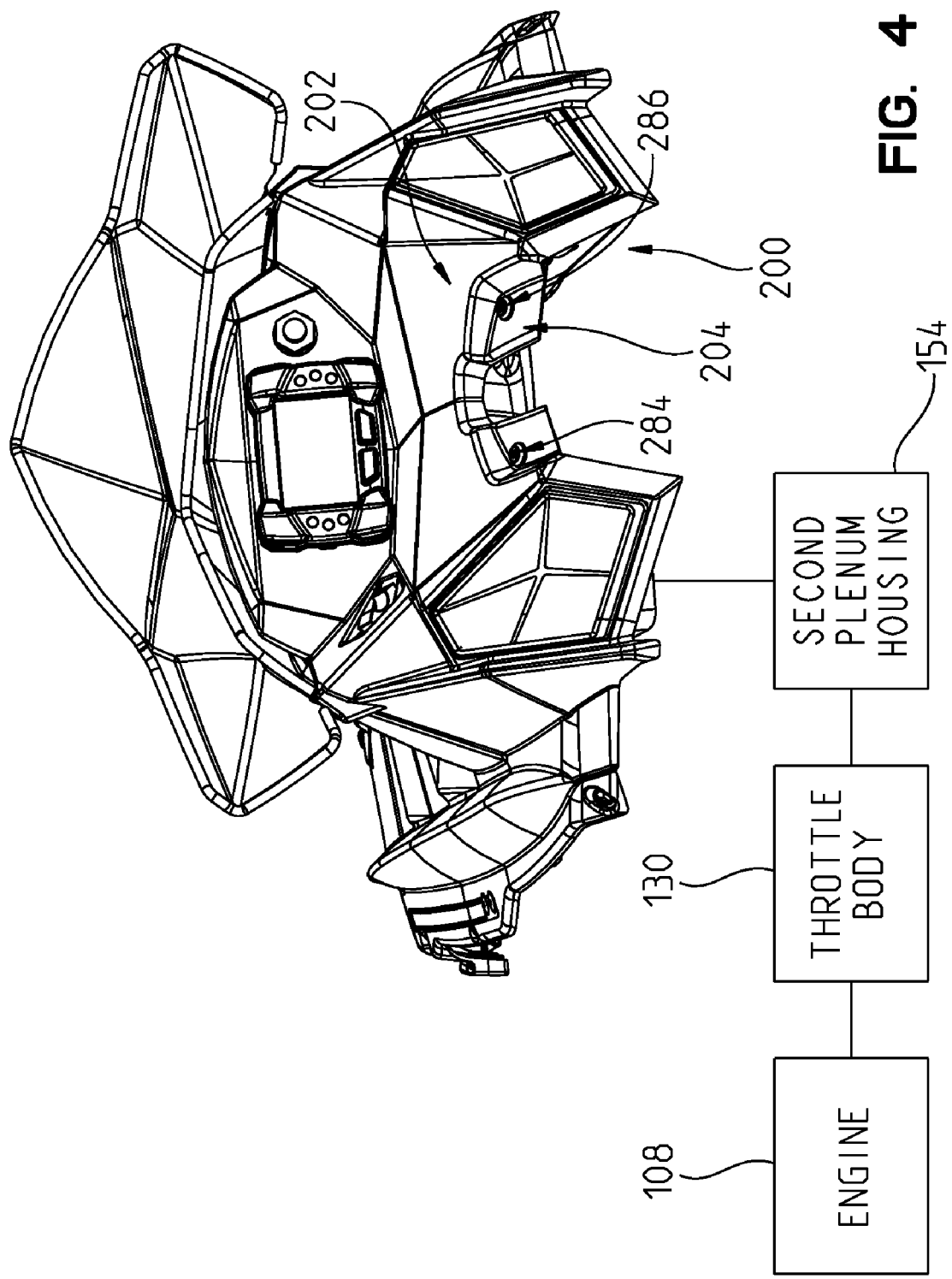
FIG. 4 illustrates a rear, left, perspective view of an operator dash cowling of the exemplary snowmobile of FIG. 1 which forms part of a first plenum housing of the air intake system of the exemplary snowmobile of FIG. 1.
Figure 6:
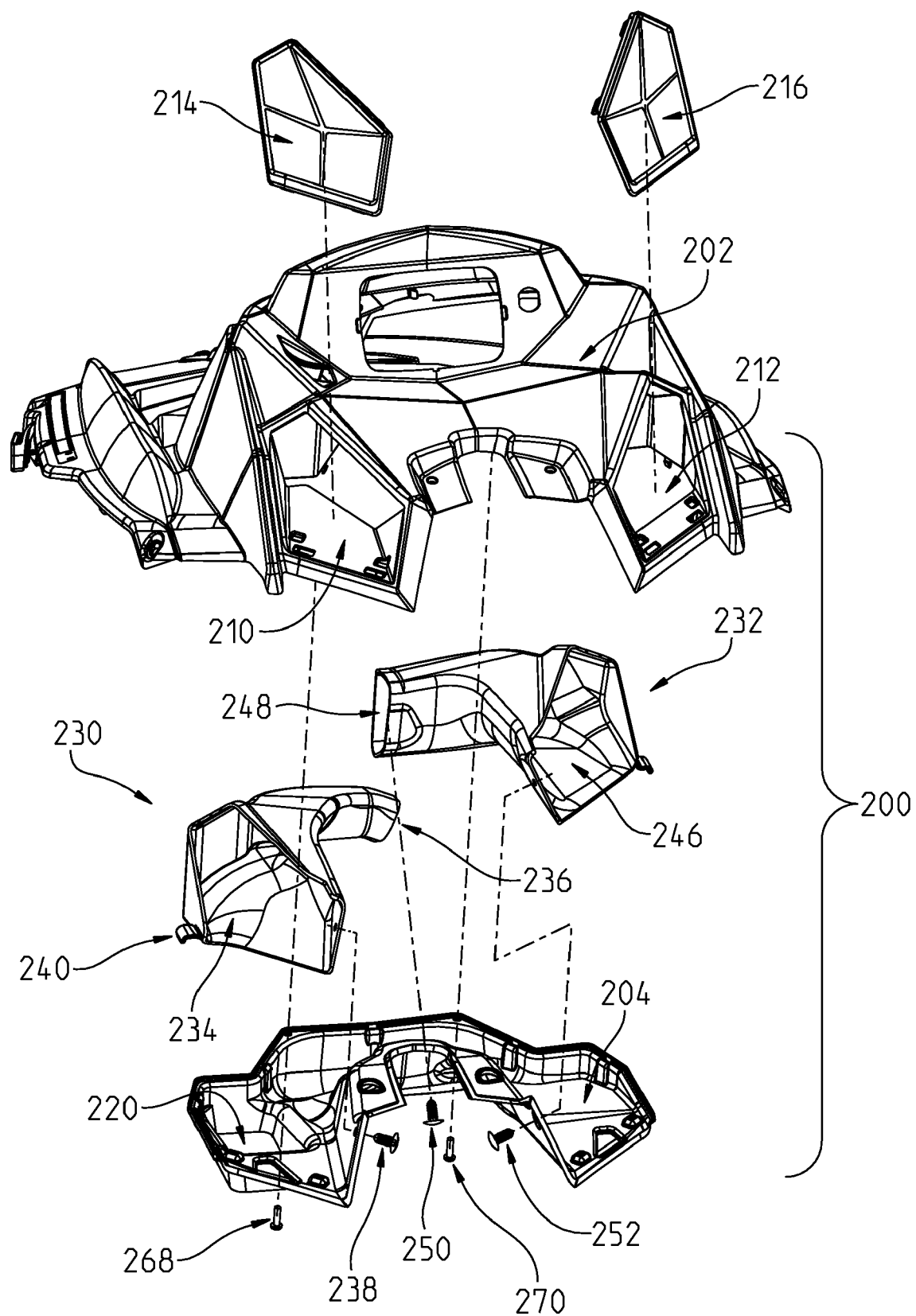
FIG. 6 illustrates an exploded view of the first plenum housing of FIG. 4 including the operator dash cowling, a lower housing tray member, a left air directing conduit, a right air directing conduit, and a pair of air intake guards.
Figure 7:
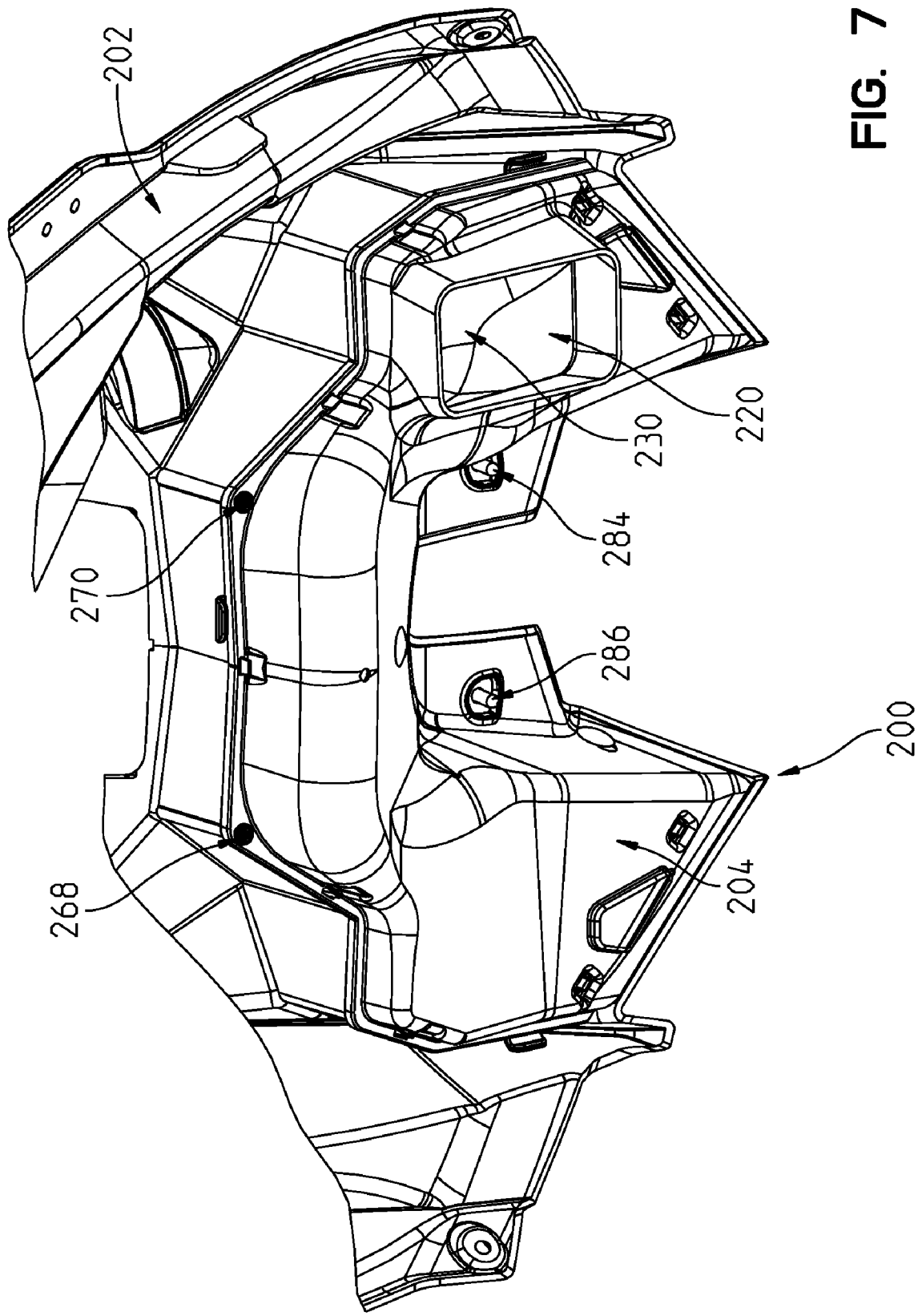
FIG. 7 illustrates a lower view of the assembled first plenum housing of FIG. 6.

Referring to FIG. 4, an exemplary first plenum housing 200 for vehicle 100 is illustrated. First plenum housing 200 is formed by an operator dash cowling 202 and a lower housing tray member 204. Referring to FIG. 6, first plenum housing 200 includes a left air inlet 210 and a right air inlet 212. Left air inlet 210 is generally covered by a guard member 214 as shown in FIG. 4. Right air inlet 212 is generally covered by a guard member 216 as shown in FIG. 4. First plenum housing 200 further includes an air outlet 220.

Referring to FIG. 6, a left air directing conduit 230 and a right air directing conduit 232 are shown. Left air directing conduit 230 and right air directing conduit 232 are positioned within first plenum housing 200 proximate to respective air inlets 210 and 212 and extend into the volume of first plenum housing 200. Left air directing conduit includes an air inlet 234 and an air outlet 236. Left air directing conduit 230 is coupled to lower housing tray member 204 with a fastener 238. In the illustrated embodiment, fastener 238 is a push-in fastener. Other exemplary fasteners include snaps, screws, rivets, and other suitable fasteners. Left air directing conduit 230 further includes a first locator 240 and a second locator 242 (see FIG. 9) which locate left air directing conduit 230 relative to lower housing tray member 204. In the illustrated embodiment, first locator 240 and second locator 242 are tabs which extend over a lip 244 of lower housing tray member 204. Lip 244 includes recesses to receive the tabs. Locator 242 also maintains left air directing conduit 230 is a raised position, as shown in FIG. 10, to permit air to flow towards air outlet 220 of lower housing tray member 204.

Right air directing conduit 232 includes an air inlet 246 and an air outlet 248. Right air directing conduit 232 is coupled to lower housing tray member 204 with a fastener 250 and a fastener 252. In the illustrated embodiment, fasteners 250 and 252 are push-in fasteners. Other exemplary fasteners include snaps, screws, rivets, and other suitable fasteners. Right air directing conduit 232 further includes a first locator 254 which locates right air directing conduit 232 relative to lower housing tray member 204. In the illustrated embodiment, first locator 254 is a tab which extend over lip 244 of lower housing tray member 204. Lip 244 includes a recess to receive the tab.

Figure 9:
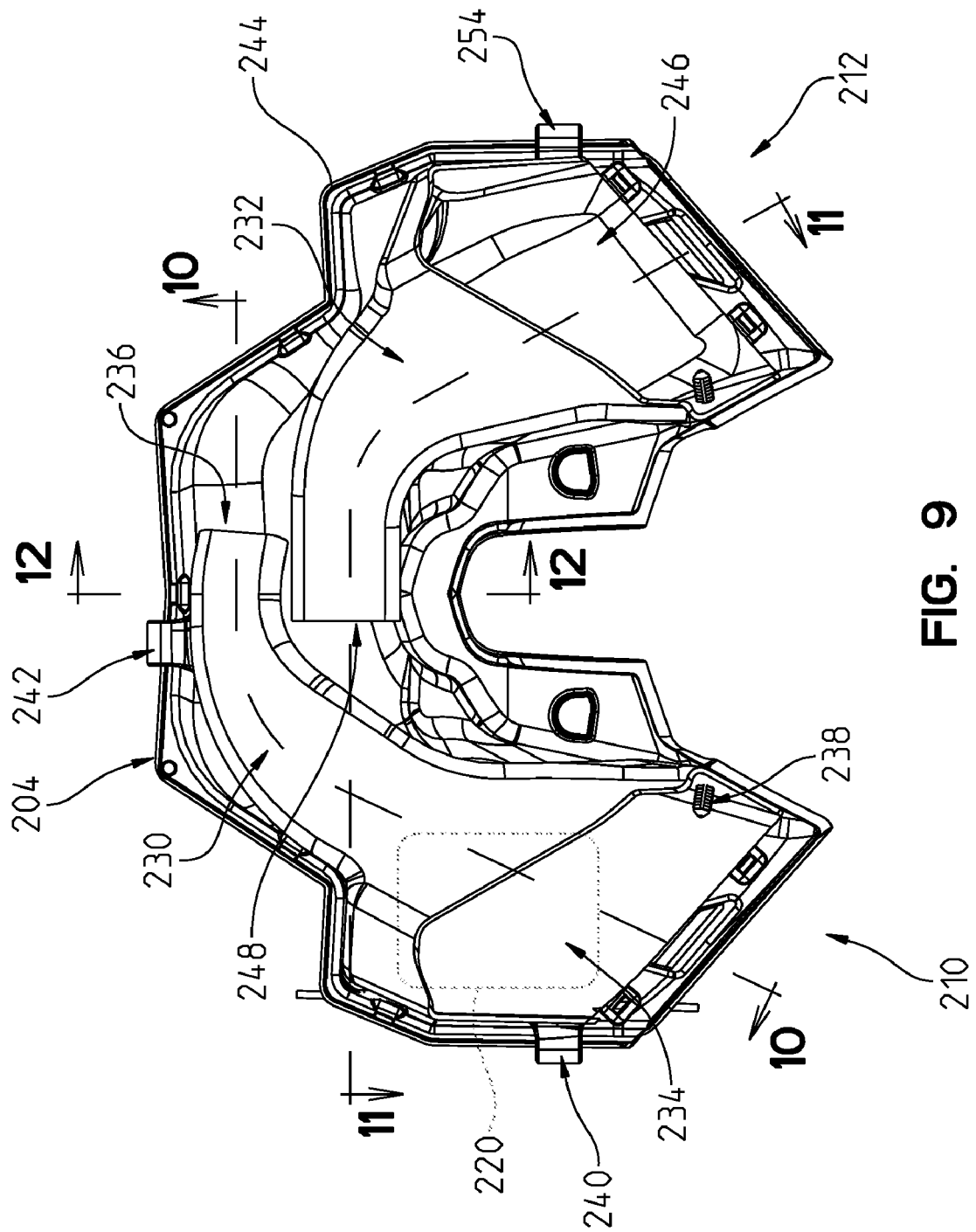
FIG. 9 illustrates a top view of the lower housing tray member of the first plenum housing, the left air directing conduit of the first plenum housing positioned to receive air through a left side air inlet shown in FIG. 4, and the right fluid directing conduit of the first plenum housing positioned to receive air through a right side air inlet shown in FIG. 4.
Figure 10:
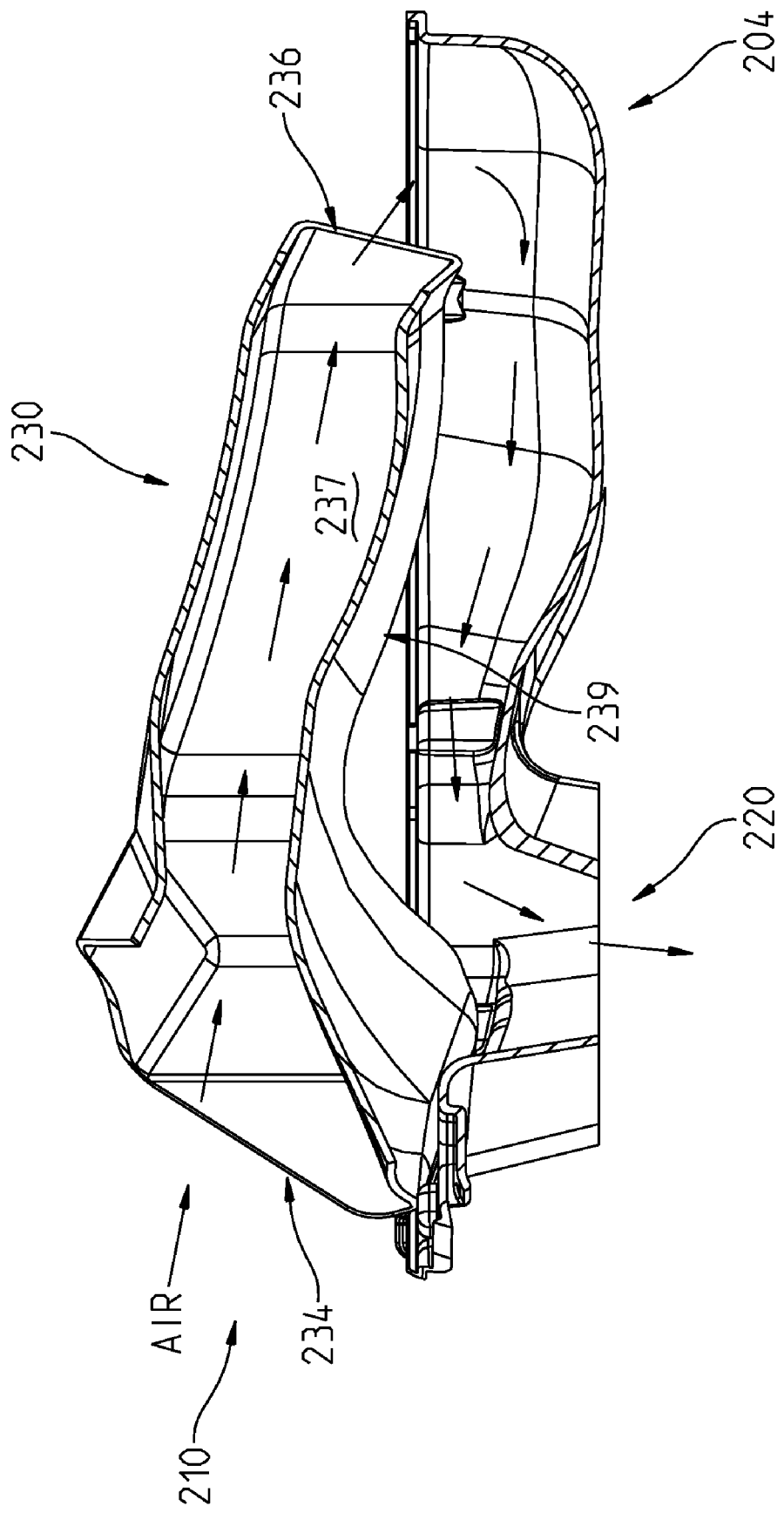
FIG. 10 illustrates a cut-away view through the assembly of FIG. 9 along lines 10-10 in FIG. 9.

Referring to FIG. 9, left air directing conduit 230 is generally positioned on a left side of lower housing tray member 204 while right air directing conduit 232 is generally positioned on a right side of lower housing tray member 204. Left air directing conduit 230 also is positioned over air outlet 220. Air which enters first plenum housing 200 through air inlet 210 enters air inlet 234 of left air directing conduit 230 and is directed away from air outlet 220 by left air directing conduit 230. The flow of the air is represented in FIG. 10. The air flows through an interior 237 of left air directing conduit 230 and exits left air directing conduit 230 through air outlet 236. Upon exiting left air directing conduit 230, the air then travels back towards air outlet 220 along an exterior 239 of left air directing conduit 230. The shape of exterior 239 generally directs the air towards air outlet 220.

Figure 11:
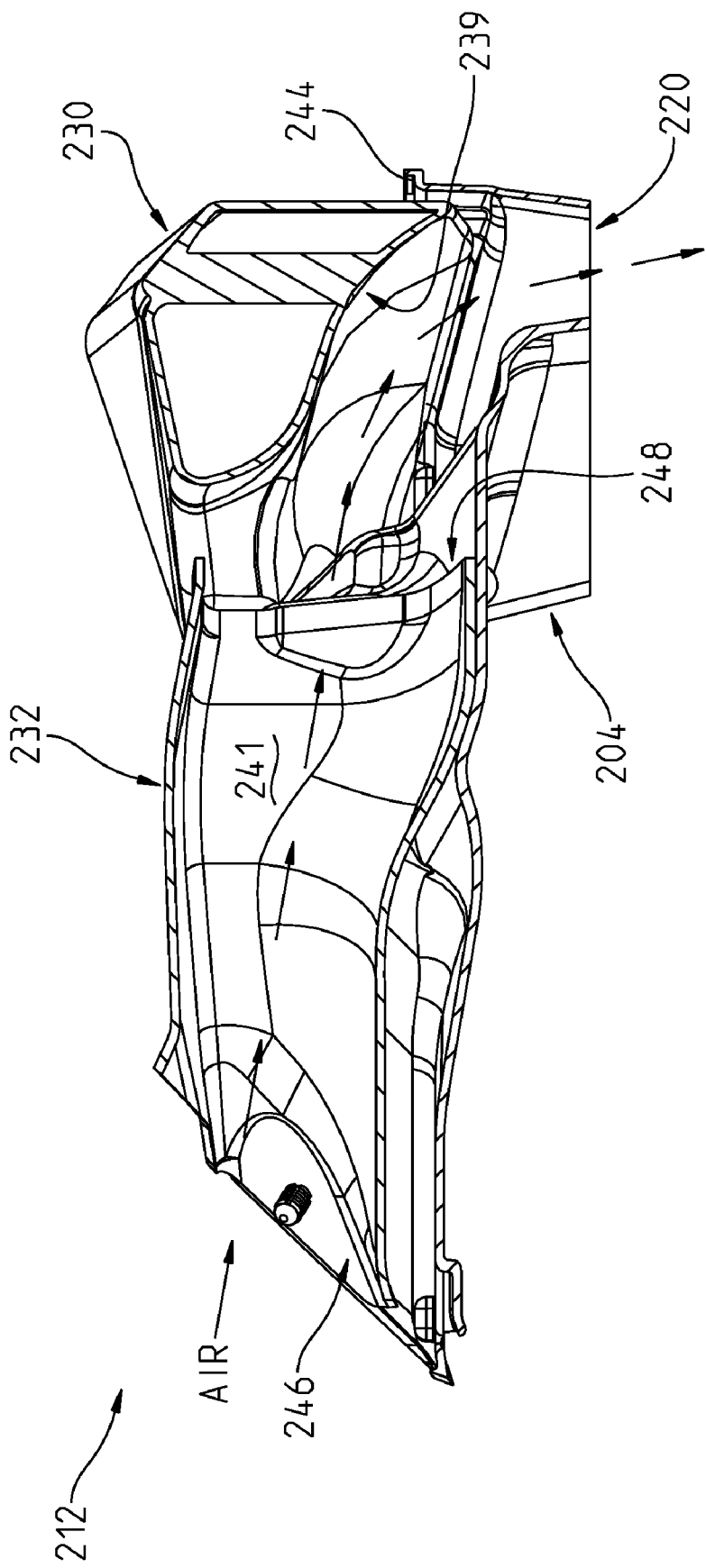
FIG. 11 illustrates a cut-away view through the assembly of FIG. 9 along lines 11-11 in FIG. 9.

Returning to FIG. 9, right air directing conduit 232 is not positioned over air outlet 220. Air which enters first plenum housing 200 through air inlet 212 enters air inlet 246 of right air directing conduit 232 and is directed towards air outlet 220 by right air directing conduit 232. The flow of the air is represented in FIG. 11. The air flows through an interior 241 of right air directing conduit 232 and exits right air directing conduit 232 through air outlet 248. Upon exiting right air directing conduit 232, the air then travels along the exterior 239 of left air directing conduit 230. The shape of exterior 239 generally directs the air towards air outlet 220.

Figure 12:
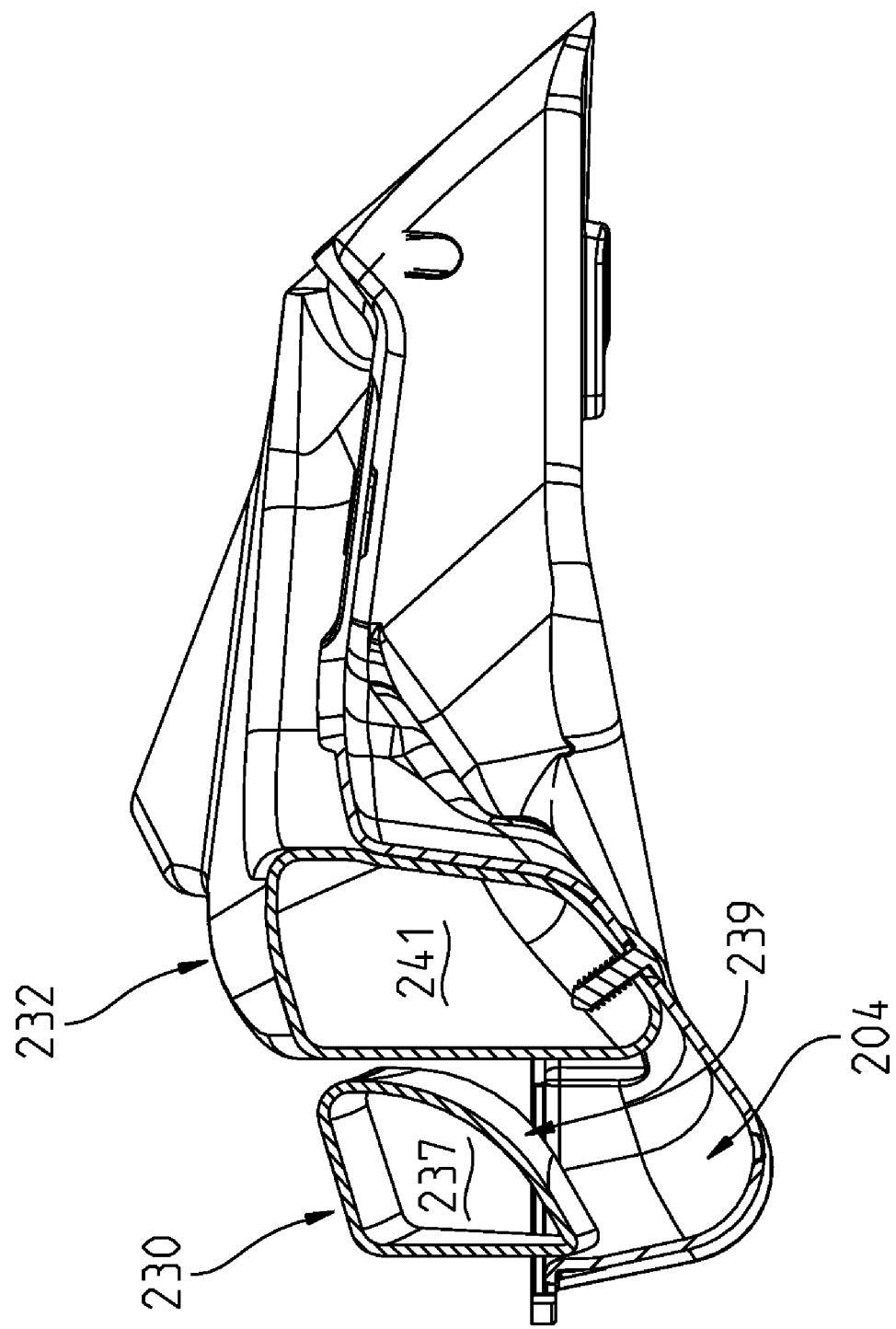
FIG. 12 illustrates a cut-away view through the assembly of FIG. 5 along lines 12-12 in FIG. 9.
Figure 13:
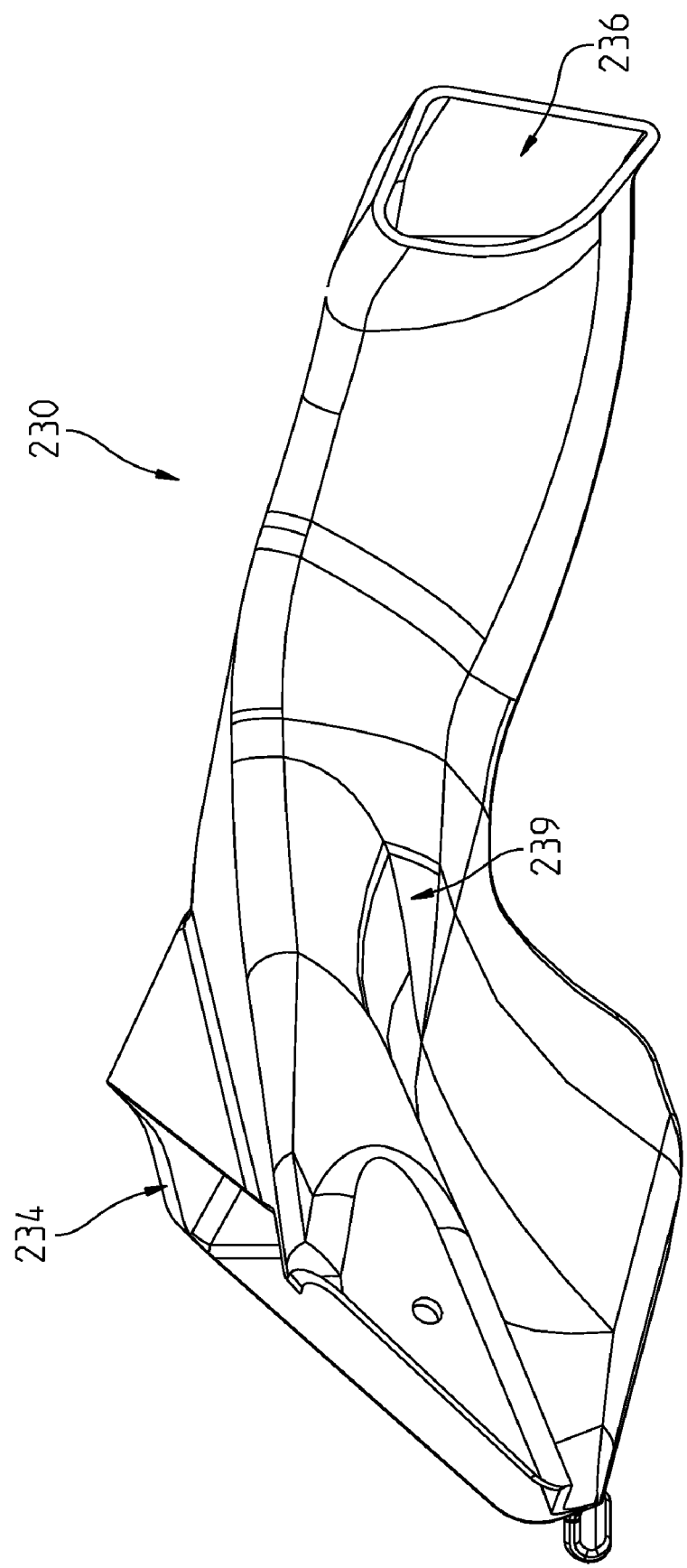
FIG. 13 illustrates a side view of the left fluid directing conduit of FIG. 9.
Figure 14:
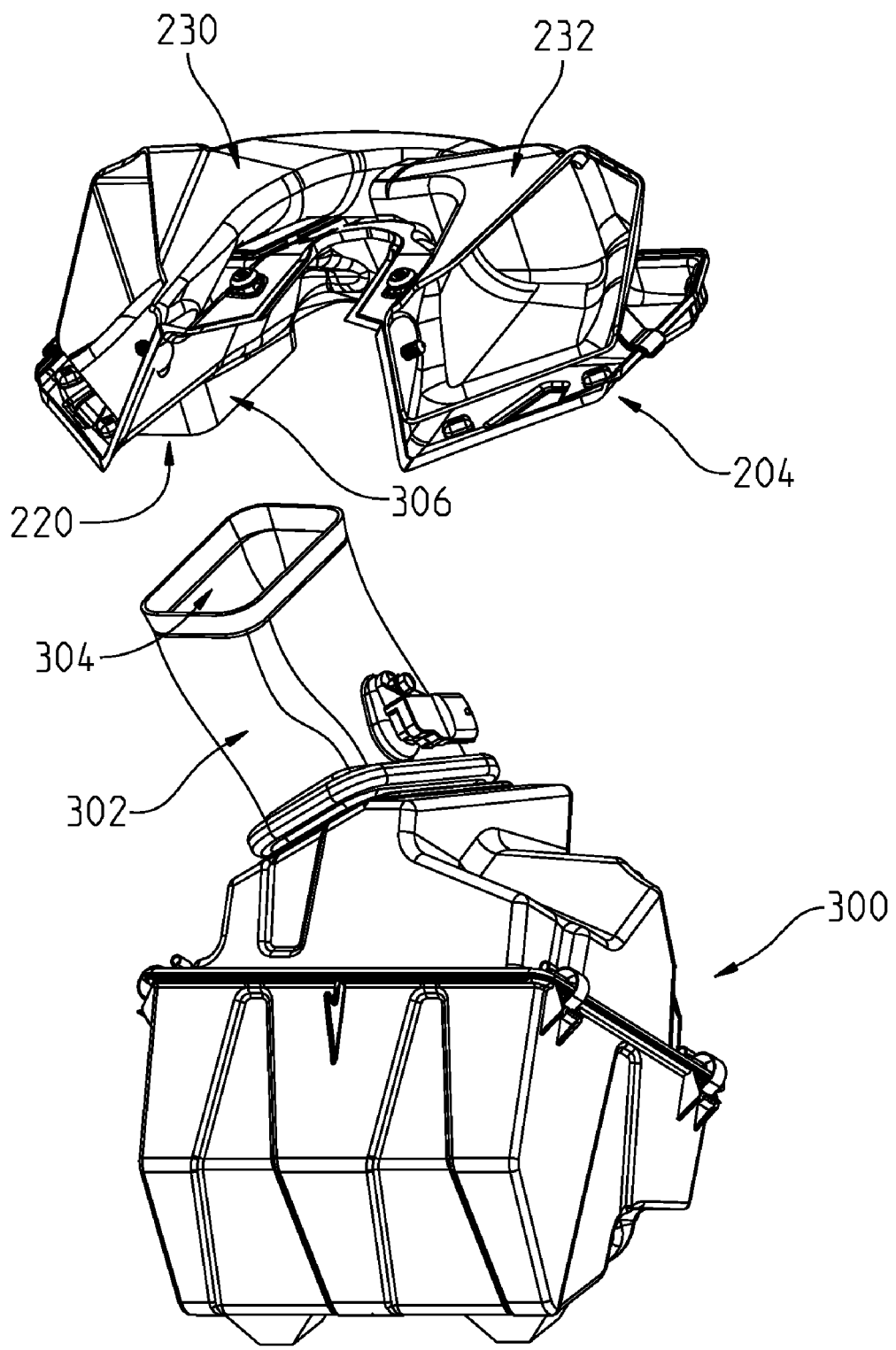
FIG. 14 illustrates a perspective view of the components of FIG. 9; a fluid conduit connecting the lower plenum housing tray member to a second plenum housing.
Figure 16:
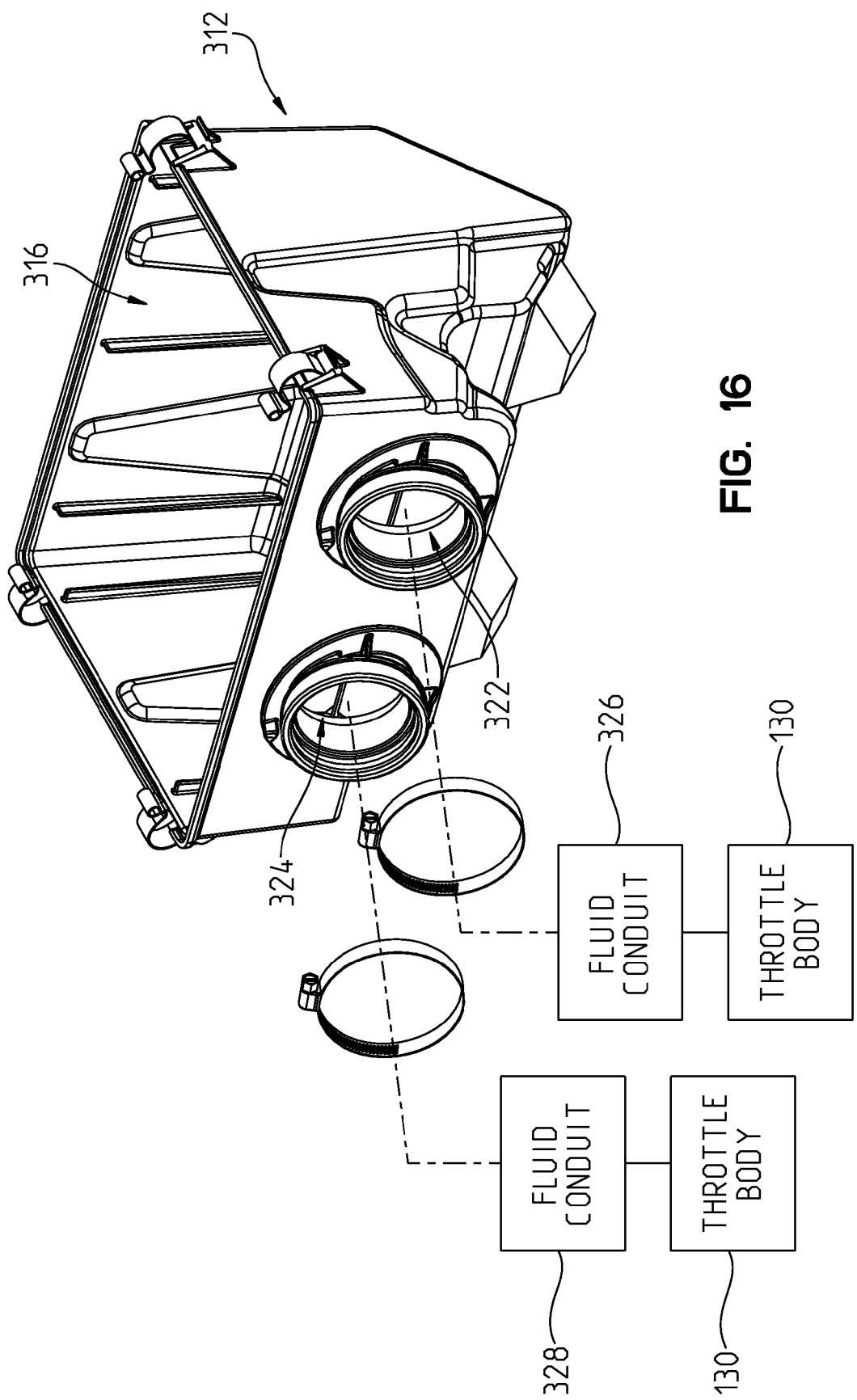
FIG. 16 illustrates a lower housing member of the second plenum housing of FIG. 10.

Referring to FIG. 12, the cross-sectional area of interior 237 of left air directing conduit 230 and of interior 241 of right air directing conduit 232 is chosen to both provide needed air flow to air outlet 220 and to balance the noise level exiting air inlet 210 and air inlet 212. Further, the difference in path length back to air inlet 210 and air inlet 212 also varies the noise levels. In the illustrated embodiment, the area of the air inlet 234 of fluid conduit 230 is about 11,450 square millimeters, the area of air outlet 236 of fluid conduit 230 is about 1,265 square millimeters, the area of the air inlet 246 of fluid conduit 232 is about 11,450 square millimeters, the area of air outlet 248 of fluid conduit 232 is about 2,975 square millimeters. The ratio of the area of air outlet 248 to the area of air outlet 236 is about 2.5. This results in about 70 percent of the air flow to air outlet 220 entering air inlet 212 and about 30 percent entering air inlet 210 while generally balancing the noise produced through air inlet 210 and air inlet 212. Without left air directing conduit 230 more sound exits through air inlet 210 (about 90 percent) than air inlet 212 (about 10 percent).

Removing left air directing conduit 230 results in about an 8 dB increase in the sound level directed at an operator positioned on seat 110. Further, it increases the sound level of a drive by test by about 2 dB. An exemplary drive by test is a 150 foot course which the snowmobile enters at 15 miles per hour and passes through the course at full throttle. A microphone is positioned at 75 feet into the course and 50 feet transverse to the course. Exemplary drive by tests are the SAE J1161 which is a test done a 15 mph and the SAE J192 which is a test done at full throttle.

Figure 8:
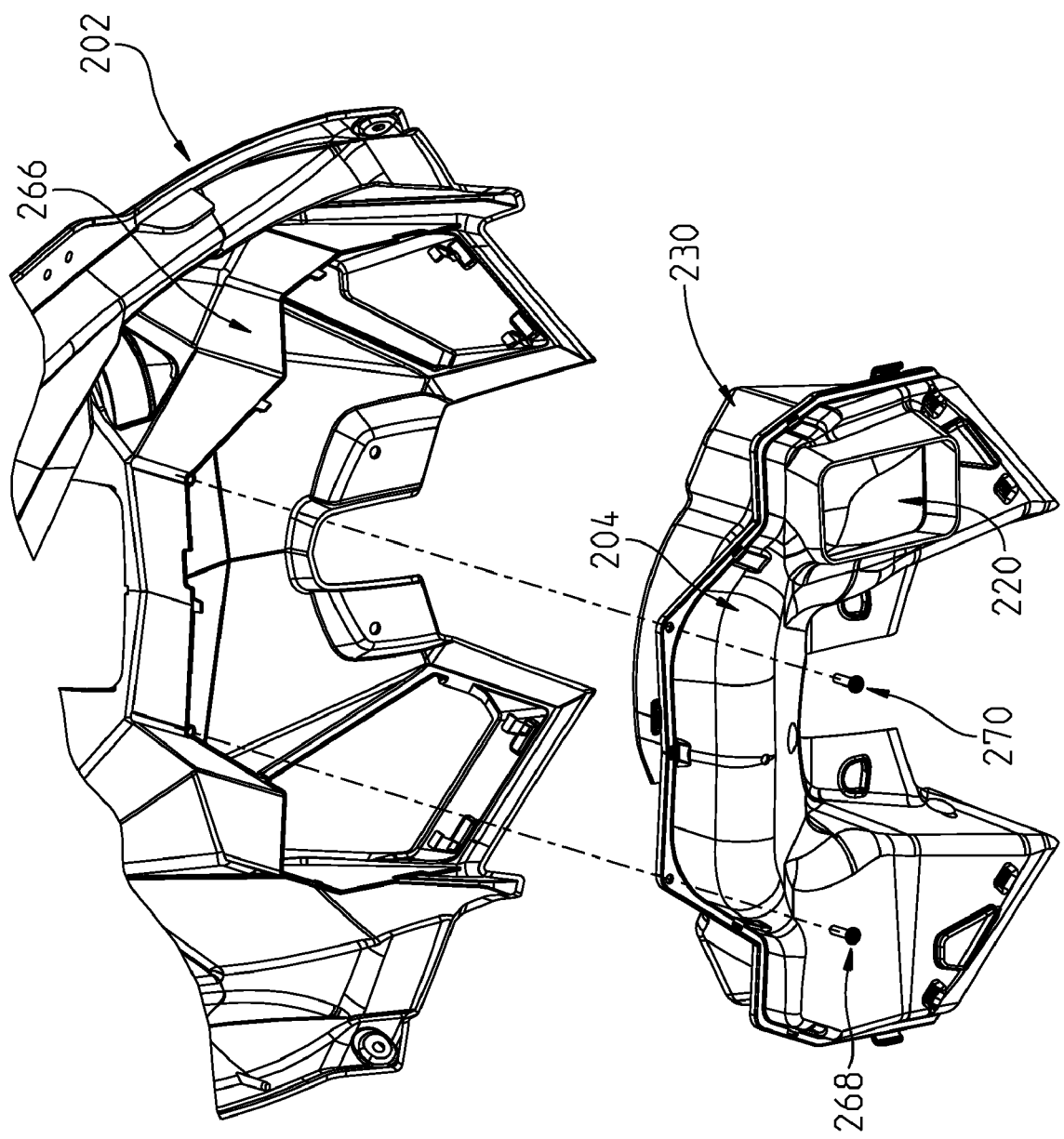
FIG. 8 illustrates the assembly of FIG. 7 with the operator dash cowling exploded relative to the lower housing tray member.

Referring to FIG. 6, first plenum housing 200 may be assembled in the following manner. Right directing air conduit 232 is coupled to lower housing tray member 204 with fasteners 250 and 252. Left directing air conduit 230 is coupled to lower housing tray member 204 with fastener 238. Guards 214 and 216 are positioned in air inlet 210 and air inlet 212, respectively. In one embodiment, guards 214 and 216 snap into the walls surrounding air inlets 210 and 212, respectively. Referring to FIG. 8, lower housing tray member 204 is further coupled to a wall 266 of operator dash cowling 202 through fasteners 268 and 270.

Figure 5:
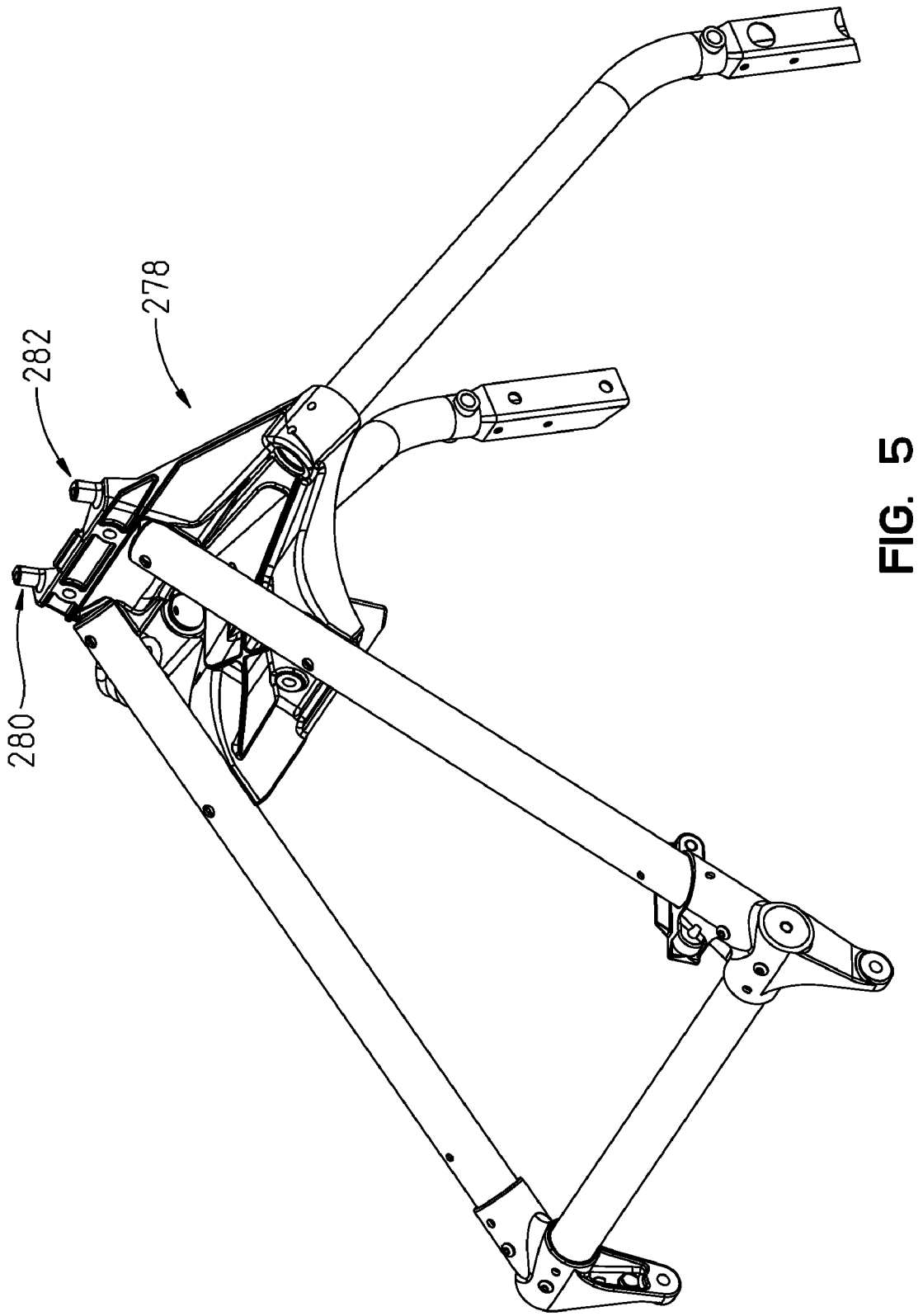
FIG. 5 illustrates a front, perspective view of an over structure of a frame of the exemplary snowmobile of FIG. 1.

Referring to FIGS. 4 and 5, first plenum housing 200 is secured to an overstructure 278 (FIG. 5) of the frame of vehicle 100. First plenum housing 200 is secured to bosses 280 and 282 of overstructure 278 with fasteners 284 and 286. Additional details regarding overstructure 278 are provided in U.S. Provisional Patent Application Ser. No. 61/104,436, filed Oct. 10, 2008, the disclosure of which is expressly incorporated by reference herein.

Referring to FIG. 12, lower housing tray member 204 of first plenum housing 200 is in fluid communication with an exemplary second plenum housing 300 through a fluid conduit 302. Fluid conduit 302 includes an opening 304 to receive a downwardly extending member 306 of lower housing tray member 204 which contains air outlet 220. Second plenum housing 300 includes an upper housing member 310 and a lower housing member 312. An interior of second plenum housing 300 is divided into two chambers by a divider 318. A first chamber 314 is provided in upper housing member 310 and is in fluid communication with fluid conduit 302 through an air inlet 320. A second chamber 316 is provided in lower housing member 312 and is in fluid communication with a pair of throttle bodies through fluid conduits 326 and 328 coupled to fluid outlets 322 and 324. First chamber 314 is in fluid communication with second chamber 316 through a pair of hourglass shaped conduits 330 and 332.

As shown in FIG. 2, vehicle 100 further comprises a steering post 120 operatively coupled a portion of the plurality of ground engaging members 102 and a handlebar 112 coupled to the steering post 120. The vehicle also including an operator seat 110 positioned rearward of the steering post 120. As mentioned herein, the air intake system includes a first plenum housing 200 into which the first conduit 230 extends and a first air inlet 210 and a second air inlet 212 both in fluid communication with an interior of the first plenum housing 200. The first air inlet 210 being positioned on a first side of the steering post 120 and the second air inlet 212 being positioned on a second side of the steering post 120.

Figure 17:
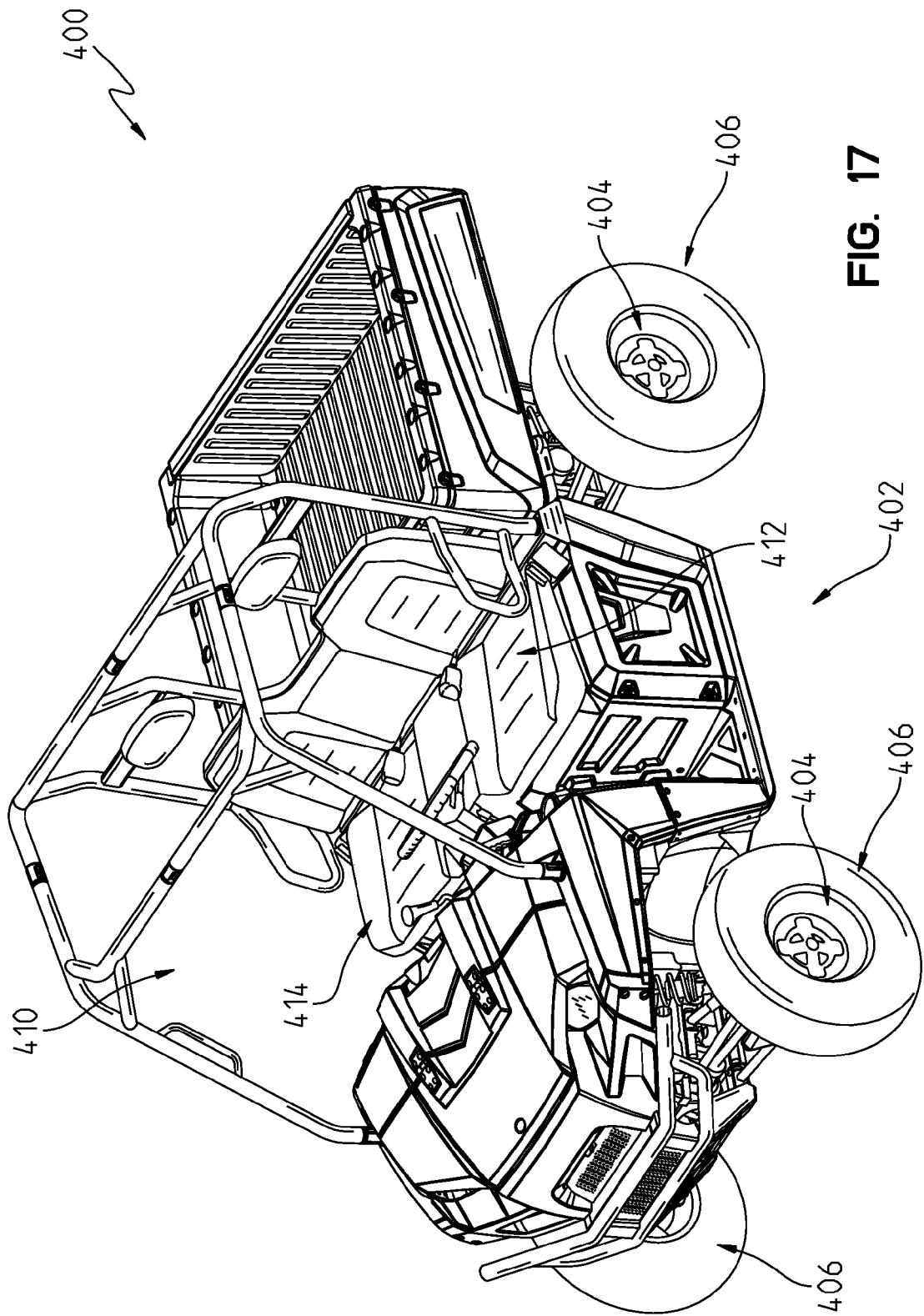
FIG. 17 illustrates a front, left, perspective view of an exemplary utility vehicle.

Referring to FIG. 17, another exemplary vehicle 400 is shown. The illustrated vehicle is a utility vehicle. Vehicle 400 as illustrated includes a plurality of ground engaging members 402. Illustratively, ground engaging members 402 are wheels 404 and associated tires 406. Vehicle 400 further includes an operator area 410 which includes an operator seat 412 and a passenger seat 414. The features of the air intake system disclosed herein may be used as part of vehicle 400. Additional details regarding vehicle 400 are provided in U.S. patent application Ser. No. 12/135,107, filed Jun. 6, 2008 and U.S. patent application Ser. No. 12/134,909, filed Jun. 6, 2008, both disclosures of which are incorporated by reference herein.

Figure 18:
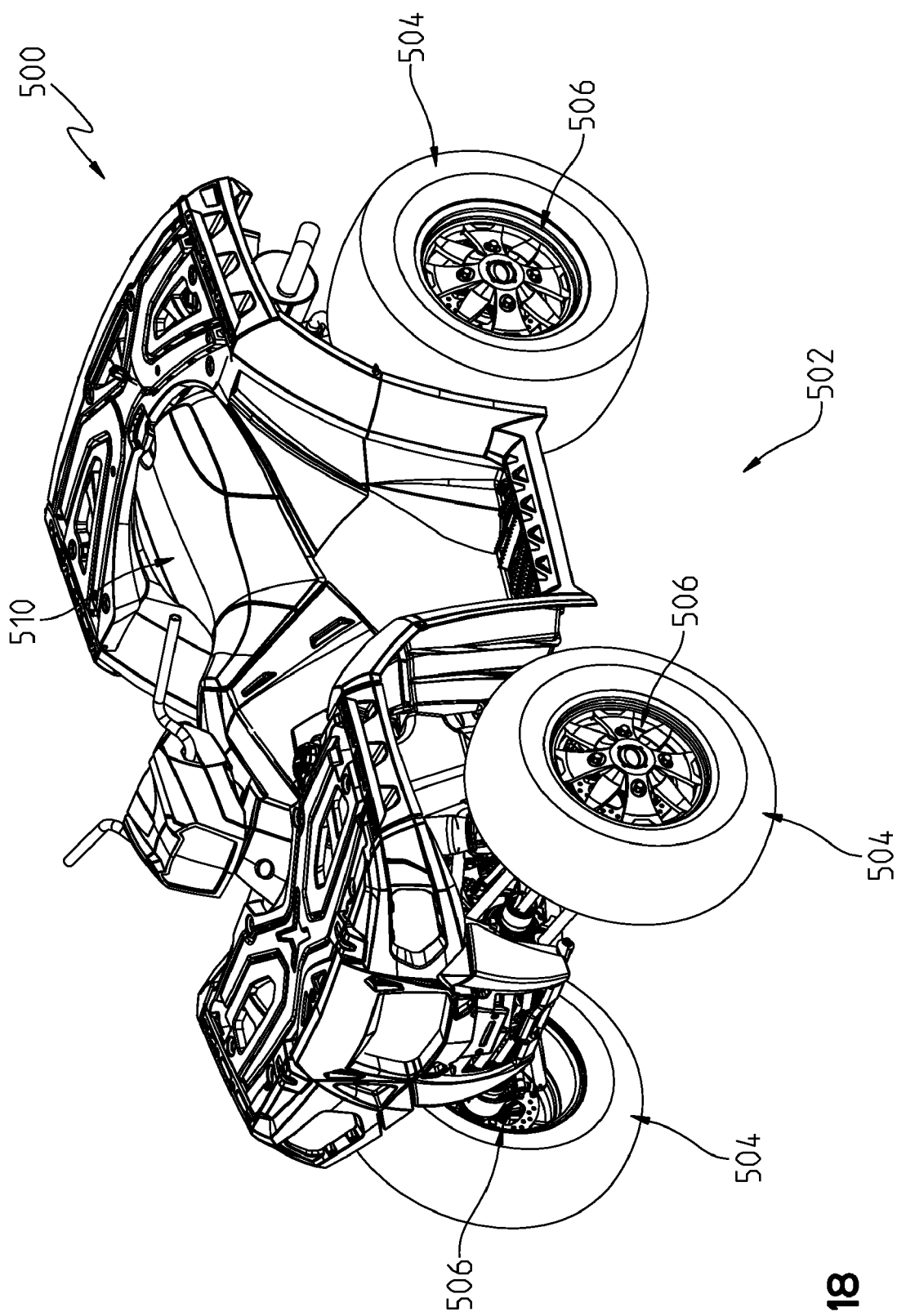
FIG. 18 illustrates a front, left, perspective view of an exemplary all-terrain vehicle.

Referring to FIG. 18, another exemplary vehicle 500 is shown. The illustrated vehicle is an all terrain vehicle. Vehicle 500 as illustrated includes a plurality of ground engaging members 502. Illustratively, ground engaging members 502 are wheels 504 and associated tires 506. Vehicle 500 further includes a straddle seat 510 for an operator. The features of the air intake system disclosed herein may be used as part of vehicle 500. Additional details regarding vehicle 500 are provided in U.S. patent applications Ser. Nos. 12/069,511, 12/069,515, and 12/069,521, each filed Feb. 11, 2008, the disclosures of which are incorporated by reference herein.

Figure 19:
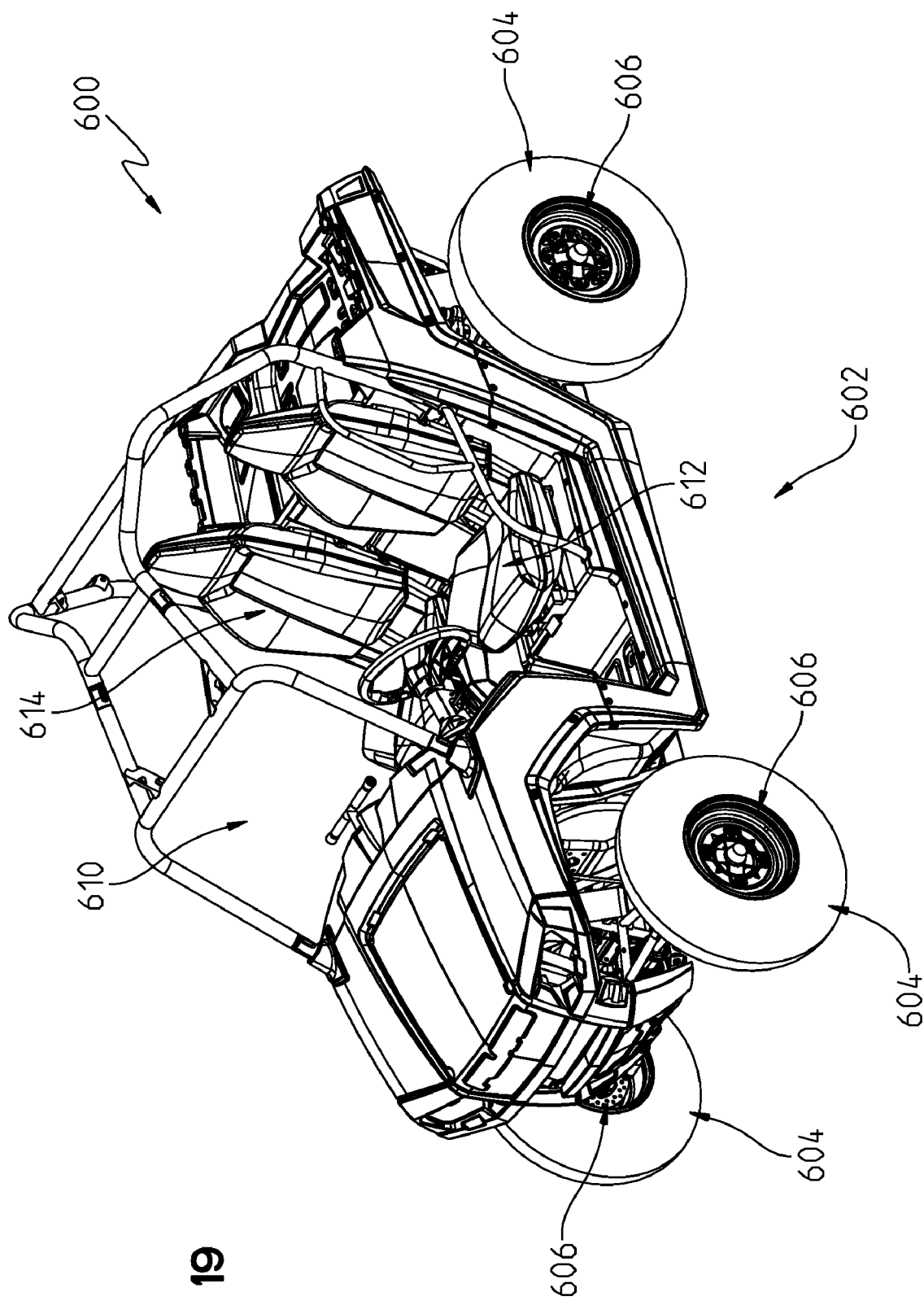
FIG. 19 illustrates a front, left, perspective view of an exemplary side-by-side vehicle.

Referring to FIG. 19, another exemplary vehicle 600 is shown. The illustrated vehicle is a side-by-side vehicle. Vehicle 600 as illustrated includes a plurality of ground engaging members 602. Illustratively, ground engaging members 602 are wheels 604 and associated tires 606. Vehicle 600 further includes an operator area 610 which includes an operator seat 612 and a passenger seat 614. The features of the air intake system disclosed herein may be used as part of vehicle 600. Additional details regarding vehicle 600 are provided in U.S. patent application Ser. No. 11/494,890, filed Jul. 28, 2006, the disclosure of which is incorporated by reference herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A vehicle, comprising:
   a plurality of ground engaging members;
   a frame supported by the plurality of the ground engaging members;
   an internal combustion engine supported by the frame and operatively coupled to at least one of the plurality of ground engaging members to propel the vehicle; and
   an air intake system including an air inlet and an air outlet, the air outlet being in fluid communication with an air inlet controlling device of the engine, the air intake system including a first conduit which passes air received at the air inlet of air intake system towards the air outlet of the air intake system, the first conduit being positioned to receive the air as it travels from the air inlet of the of air intake system to the air outlet of the air intake system, wherein the air inlet of the air intake system includes a first air inlet and a second air inlet, the air from the first air inlet flows through the interior of the first conduit and in a generally opposite direction along an exterior of the first conduit as it travels from the first air inlet of the air intake system to the air outlet of the air intake system and the air from the second air inlet flows along the exterior of the first conduit only as it travels from the first air inlet of the air intake system to the air outlet of the air intake system.

2. The vehicle of claim 1, wherein the air from the first air inlet flows first through the interior of the first conduit and subsequently along the exterior of the first conduit as it travels from the first air inlet of the air intake system to the air outlet of the air intake system.

3. The vehicle of claim 1, wherein the air intake system includes a first housing and a second housing, an interior of the first housing receiving the air passing through the air inlet of the air intake system and the second housing being in fluid communication with the air inlet controlling device and with the interior of the first housing.

4. The vehicle of claim 1, further comprising
   a steering post operatively coupled to a portion of the plurality of ground engaging members;
   a handlebar coupled to the steering post; and
   an operator seat positioned rearward of the steering post, wherein the air intake system includes a first plenum housing into which the first conduit extends and wherein the air inlet of the air intake system includes a first air inlet and a second air inlet both in fluid communication with an interior of the first plenum housing, the first air inlet being positioned on a first side of the steering post and the second air inlet being positioned on a second side of the steering post.

5. A vehicle, comprising:
   a plurality of ground engaging members;
   a frame supported by the plurality of the ground engaging members;
   an internal combustion engine supported by the frame and operatively coupled to at least one of the plurality of ground engaging members to propel the vehicle;
   an air intake system including an air inlet and an air outlet, the air outlet being in fluid communication with an air inlet controlling device of the engine, the air intake system including a first conduit which passes air received at the air inlet of air intake system towards the air outlet of the air intake system, the first conduit being positioned to receive the air as it travels from the air inlet of the of air intake system to the air outlet of the air intake system, the air flows along an exterior of the first conduit and through an interior of the first conduit as it travels from the air inlet of the of air intake system to the air outlet of the air intake system;
   a steering post operatively coupled a portion of the plurality of ground engaging members;
   a handlebar coupled to the steering post; and
   an operator seat positioned rearward of the steering post, wherein the air intake system includes a first plenum housing into which the first conduit extends and wherein the air inlet of the air intake system includes a first air inlet and a second air inlet both in fluid communication with an interior of the first plenum housing, the first air inlet being positioned on a first side of the steering post and the second air inlet being positioned on a second side of the steering post and wherein the first plenum housing is in fluid communication with the engine through a fluid outlet, the fluid outlet being positioned closer to the first air inlet than to the second air inlet, and wherein the first conduit assists in generally balancing the sound emitted from the first air inlet and the second air inlet.

6. The vehicle of claim 5, further comprising a second fluid conduit extending in the first plenum housing, the first plenum housing including a cowling housing member and a tray housing member which includes the fluid outlet of the first plenum member, wherein the first conduit and the second conduit are supported by the tray housing member.

7. The vehicle of claim 6, wherein the first fluid conduit is positioned over the fluid outlet of the first plenum housing.

8. The vehicle of claim 7, wherein the first conduit directs air from the first air inlet away from the fluid outlet of the first plenum housing as the air passes through an interior of the first conduit and towards the fluid outlet of the first plenum housing as the air passes along an exterior of the first conduit and the second conduit directs air from the second air inlet towards the fluid outlet of the first plenum housing.

9. The vehicle of claim 8, wherein the first conduit and the second conduit are each funnel shaped.

10. An air intake system for an internal combustion engine of a vehicle, comprising:
    a second plenum housing having an air inlet and an air outlet, the second plenum housing being in fluid communication with the internal combustion engine through the air outlet, the second plenum housing including a plurality of housing members which cooperate to form the second plenum housing;
    a first plenum housing having a plurality of air inlets and an air outlet, the air outlet of the first plenum housing being positioned closer to one of a first air inlet of the first plenum housing and a second air inlet of the first plenum housing than the other of the first air inlet of the first plenum housing and the second air inlet of the first plenum housing, the air outlet of the first plenum housing being in fluid communication with both the first air inlet of the first plenum housing and the second air inlet of the first plenum housing; the air outlet of the first plenum housing being in fluid communication with the air inlet of the second plenum housing such that air flows from the first plenum housing to the second plenum housing, the first plenum housing including a plurality of housing members which cooperate to form the first plenum housing; and
    a first air directing conduit in fluid communication with the first air inlet of the first plenum housing, the first directing conduit including an air inlet and an air outlet which is positioned within the first plenum housing, air entering the air inlet of the first air directing conduit flows through an interior of the first air directing conduit to the air outlet of the first air directing conduit and away from the air outlet of the first plenum housing and then between the first air directing conduit and the first plenum housing towards the air outlet of the first plenum housing.

11. The air intake system of claim 10, further comprising a second air directing conduit in fluid communication with the second air inlet of the first plenum housing, the second directing conduit including an air inlet and an air outlet which is positioned within the first plenum housing, air entering the air inlet of the second air directing conduit flows through an interior of the second air directing conduit to the air outlet of the second air directing conduit and onto the air outlet of the first plenum housing.

12. The air intake system of claim 11, wherein the air outlet of the second air directing member is positioned to direct air from the second air directing member towards the air outlet of the first plenum housing.

13. The air intake system of claim 12, wherein the air from both the first air inlet of the first plenum housing and the second air inlet of the first plenum housing must travel between an exterior of the first air directing conduit and a first housing member of the first plenum housing to reach the air outlet of the first plenum housing, the exterior of the first air directing conduit being shaped to direct the air towards the air outlet of the first plenum housing.

14. The air intake system of claim 13, wherein the second plenum housing further includes a divider which segments an interior of the second plenum housing into a plurality of chambers, a first chamber being in fluid communication with the air inlet and a second chamber being in fluid communication with the air outlet, air from the first chamber being able to flow into the second chamber.

15. The air intake system of claim 13, wherein the first air directing conduit is funnel shaped.

16. An air intake system for an internal combustion engine of a vehicle, comprising:
    a second plenum housing having a fluid inlet and a fluid outlet, the second plenum housing being in fluid communication with the engine through the fluid outlet;
    a first plenum housing having a plurality of fluid inlets and a fluid outlet, the fluid outlet being positioned closer to a first fluid inlet than a second fluid inlet and the fluid outlet being in fluid communication with both the first fluid inlet and the second fluid inlet; the fluid outlet of the first plenum housing being in fluid communication with the fluid inlet of the second plenum housing such that air flows from the first plenum housing to the second plenum housing; and
    a fluid directing conduit in fluid communication with the first fluid inlet of the first plenum housing, the fluid directing conduit directing air received through the first fluid inlet of the first plenum housing away from the fluid outlet of the first plenum housing.

17. The air intake system of claim 16, further comprising a fluid conduit in fluid communication with the fluid outlet of the first plenum housing and with the fluid inlet of the second plenum housing.

18. A method of controlling noise emitted by an air intake system of an internal combustion engine, comprising the steps of:
    providing a first fluid conduit having an air inlet and an air outlet, an area of the air outlet being less than an area of the air inlet;
    positioning the first fluid conduit into a first plenum housing of the air intake system such that air from a first air inlet of the first plenum housing enters an interior of the first fluid conduit through the air inlet of the first fluid conduit and exits through the air outlet of the first fluid conduit; and
    positioning an air outlet of the first plenum housing at a location such that the air exiting the air outlet of the first fluid conduit is directed by an exterior of the first fluid conduit towards the air outlet of the first plenum housing, wherein the first fluid conduit is supported by a tray housing member of the first plenum housing and a space between the first fluid conduit and the tray housing member is a flow path for air to reach the air outlet of the first plenum housing.

* * * * *

UNITED STATES PATENT AND TRADEMARK OFFICE
CERTIFICATE OF CORRECTION

| | |
|---|---|
| PATENT NO. | : 8,127,877 B2 |
| APPLICATION NO. | : 12/355349 |
| DATED | : March 6, 2012 |
| INVENTOR(S) | : Richard A. Fredrickson, Jerry A. Olson and Jason A. Eichenberger |

It is certified that error appears in the above-identified patent and that said Letters Patent is hereby corrected as shown below:

In the Claims:

In Claim 1, column 9, line 18, delete the second occurrence of the word "of".

In Claim 5, column 9, line 67, delete the second occurrence of the word "of".

In Claim 5, column 10, line 3, delete the second occurrence of the word "of".

Signed and Sealed this
Twelfth Day of November, 2013

Teresa Stanek Rea
*Deputy Director of the United States Patent and Trademark Office*